United States Patent [19]
Minor et al.

[11] Patent Number: 6,001,273
[45] Date of Patent: Dec. 14, 1999

[54] BINARY AZEOTROPES OF DIFLUOROMETHANE AND HYDROCARBONS

[76] Inventors: Barbara Haviland Minor, 233 Green Haven Dr., Elkton, Md. 21921; Donald Bernard Bivens, 210 W. Locust La., Kennett Square, Pa. 19348; Brooks Shawn Lunger, 2 Coolidge Ct., Newark, Del. 19702

[21] Appl. No.: 09/014,449

[22] Filed: Jan. 28, 1998

Related U.S. Application Data

[62] Division of application No. 08/842,164, Apr. 23, 1997, Pat. No. 5,785,883, which is a division of application No. 08/435,108, May 4, 1995, Pat. No. 5,672,293, which is a division of application No. 08/208,777, Mar. 11, 1994, Pat. No. 5,417,871.

[51] Int. Cl.$^6$ ...................................................... C09K 5/04
[52] U.S. Cl. .................. 252/67; 62/114; 510/408
[58] Field of Search .............................. 252/67; 510/408; 62/114

[56] References Cited

U.S. PATENT DOCUMENTS

| | | | |
|---|---|---|---|
| 4,174,295 | 11/1979 | Bargigia et al. | 252/305 |
| 4,482,465 | 11/1984 | Gray | 252/67 |
| 5,492,541 | 2/1996 | Murphy et al. | 8/423 |
| 5,538,661 | 7/1996 | Dawson et al. | 252/68 |
| 5,601,753 | 2/1997 | Omure et al. | 252/67 |
| 5,624,596 | 4/1997 | Lunger et al. | 252/68 |

*Primary Examiner*—Christine Skane

[57] ABSTRACT

Refrigerant compositions include mixtures of difluoromethane and isobutane, butane, propylene or cyclopropane; pentafluoroethane and propylene or cyclopropane; 1,1,2,2-tetrafluoroethane and propane; 1,1,1,2-tetrafluoroethane and cyclopropane; 1,1,1-trifluoroethane and DME or propylene; 1,1-difluoroethane and propane, isobutane, butane or cyclopropane; fluoroethane and propane or cyclopropane; 1,1,1,2,2,3,3-heptafluoropropane and butane, cyclopropane, DME, isobutane or propane; or 1,1,1,2,3,3,3-heptafluoropropane and butane, cyclopropane, isobutane or propane.

7 Claims, 24 Drawing Sheets

BINARY AZEOTROPES OF DIFLUOROMETHANE AND HYDROCARBONS

This is a division of application Ser. No. 08/842,164, filed on Apr. 23, 1997, now U.S. Pat. No. 5,785,883, which is a divisional of Ser. No.08/435,108, filed on May 4, 1995, now U.S. Pat. No. 5,672,293, granted Sep. 30, 1997, which is a divisional of Ser. No. 08/208,777, filed on Mar. 11, 1994, now U.S. Pat. No. 5.417,871 granted May 23, 1995.

FIELD OF THE INVENTION

This invention relates to refrigerant compositions that include a hydrofluorocarbon as a component. These compositions are also useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable to use as a refrigerant a single fluorinated hydrocarbon or an azeotropic or azeotrope-like composition that includes at least one fluorinated hydrocarbon.

Mixtures that include a fluorinated hydrocarbon may also be used as a cleaning agent or solvent to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated hydrocarbon are also useful as blowing agents in the manufacture of closed-cell polyurethane, phenolic and thermoplastic foams, as propellants in aerosols, as heat transfer media, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

SUMMARY OF THE INVENTION

The present invention relates to the discovery of refrigerant compositions of difluoromethane (HFC-32) and isobutane, butane, propylene or cyclopropane; pentafluoroethane (HFC-125) and propylene or cyclopropane; 1,1,2,2-tetrafluoroethane (HFC-134) and propane; 1,1,1,2-tetrafluoroethane (HFC-134a) and cyclopropane; 1,1,1-trifluoroethane (HFC-143a) and dimethyl ether (DME) or propylene; 1,1-difluoroethane (HFC-152a) and propane, isobutane, butane or cyclopropane; fluoroethane (HFC-161) and propane or cyclopropane; 1,1,1,2,2,3,3-heptafluoropropane (HFC-227ca) and butane, cyclopropane, DME, isobutane or propane; or 1,1,1,2,3,3,3-heptafluoropropane (HFC-227ea) and butane, cyclopropane, isobutane or propane. These compositions are also useful as cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

Further, the invention relates to the discovery of binary azeotropic or azeotrope-like compositions comprising effective amounts of difluoromethane (HFC-32) and isobutane, butane, propylene or cyclopropane; pentafluoroethane (HFC-125) and propylene or cyclopropane; 1,1,2,2-tetrafluoroethane (HFC-134) and propane; 1,1,1,2-tetrafluoroethane (HFC-134a) and cyclopropane; 1,1,1-trifluoroethane (HFC-143a) and propylene; 1,1-difluoroethane (HFC-152a) and propane, isobutane, butane and cyclopropane; fluoroethane (HFC-161) and propane or cyclopropane; 1,1,1,2,2,3,3-heptafluoropropane (HFC-227ca) and butane, cyclopropane, DME, isobutane or propane; or 1,1,1,2,3,3,3-heptafluoropropane (HFC-227ea) and butane, cyclopropane, isobutane or propane to form an azeotropic or azeotrope-like composition.

DETAILED DESCRIPTION

Figure 1:
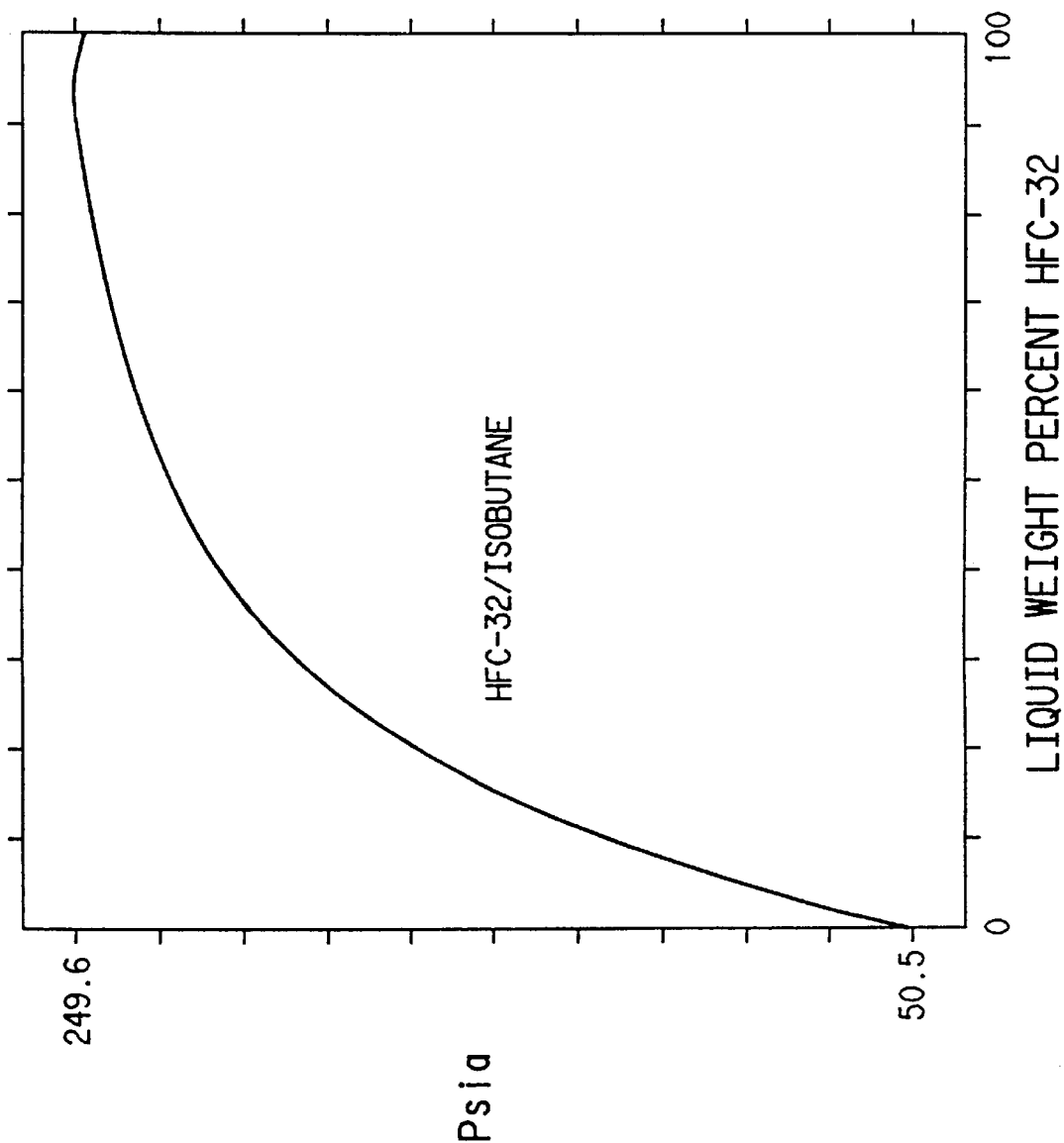
FIG. 1 is a graph of the vapor pressure of liquid mixtures of HFC-32 and isobutane at 25° C.
Figure 2:
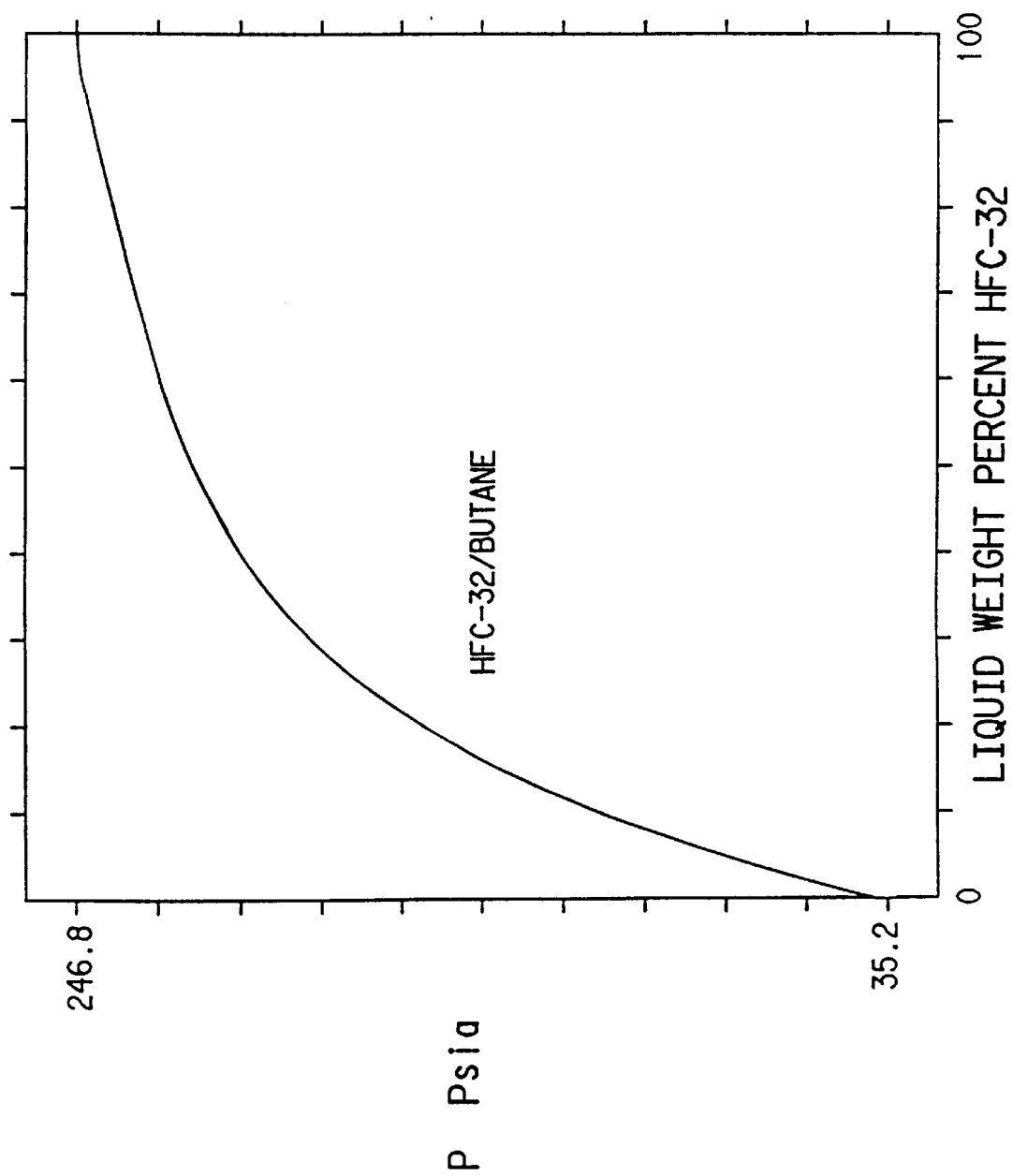
FIG. 2 is a graph of the vapor pressure of liquid mixtures of HFC-32 and butane at 25° C.
Figure 3:
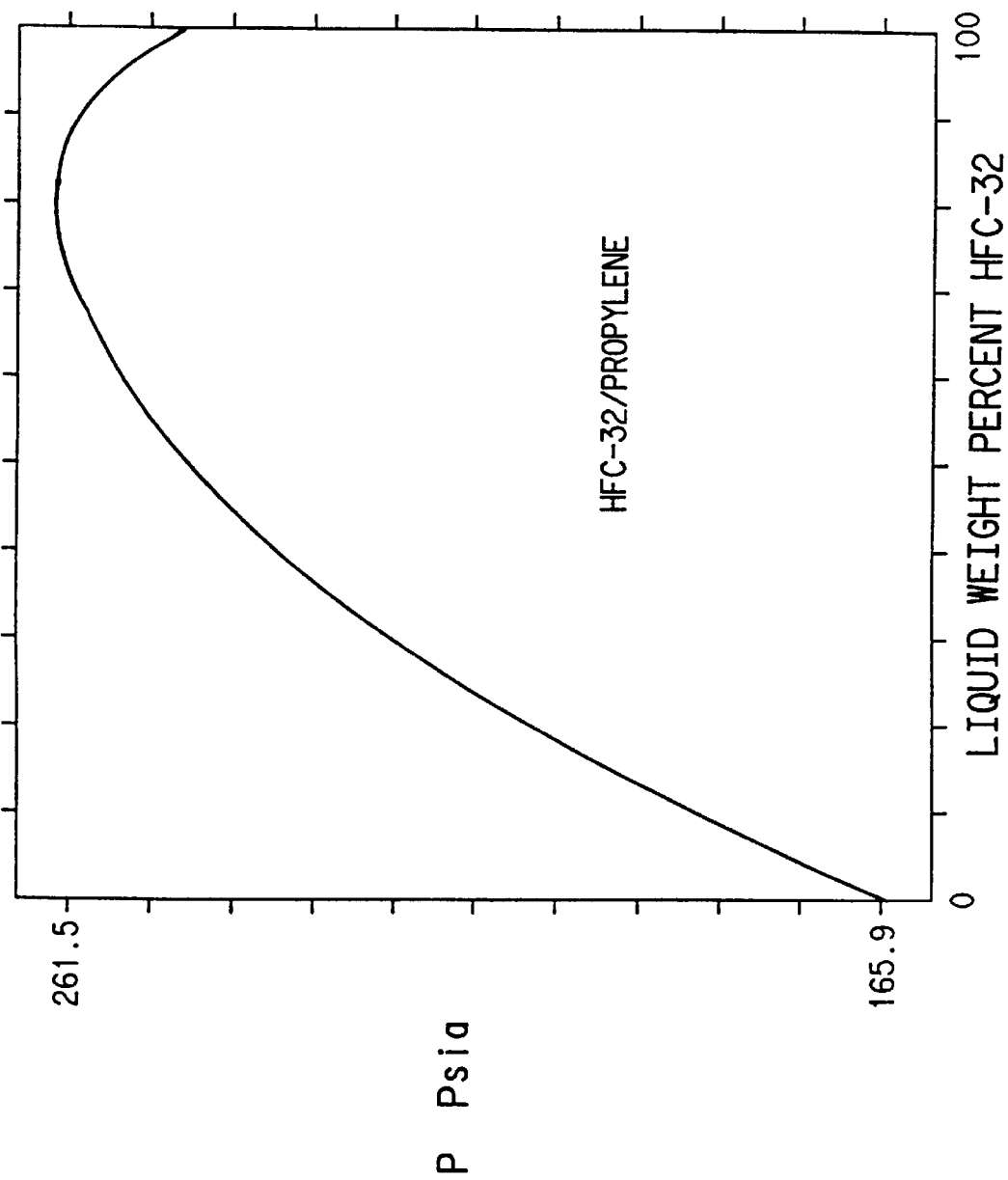
FIG. 3 is a graph of the vapor pressure of liquid mixtures of HFC-32 and propylene at 25° C.

The present invention relates to compositions of difluoromethane (HFC-32) and isobutane, butane, propylene or cyclopropane; pentafluoroethane (HFC-125) and propylene and cyclopropane; 1,1,2,2-tetrafluoroethane (HFC-134) and propane; 1,1,1,2-tetrafluoroethane (HFC-134a) and cyclopropane; 1,1,1-trifluoroethane (HFC-143a) and dimethyl ether (DME) or propylene; 1,1-difluoroethane (HFC-152a) and propane, isobutane, butane and cyclopropane; fluoroethane (HFC-161) and propane or cyclopropane; 1,1,1,2,2,3,3-heptafluoropropane (HFC-227ca) and butane, cyclopropane, DME, isobutane or propane; or 1,1,1,2,3,3,3-heptafluoropropane (HFC-227ea) and butane, cyclopropane, isobutane or propane.

The present invention also relates to the discovery of azeotropic or azeotrope-like compositions of effective amounts of difluoromethane (HFC-32) and isobutane, butane, propylene or cyclopropane; pentafluoroethane (HFC-125) and propylene or cyclopropane; 1,1,2,2-tetrafluoroethane (HFC-134) and propane; 1,1,1,2-tetrafluoroethane (HFC-134a) and cyclopropane; 1,1,1-trifluoroethane (HFC-143a) propylene; 1,1-difluoroethane (HFC-152a and propane, isobutane, butane and cyclopropane; fluoroethane (HFC-161) and propane or cyclopropane; 1,1,1,2,2,3,3-heptafluoropropane (HFC-227ca) and butane, cyclopropane, DME, isobutane or propane; or 1,1,1,2,3,3,3-heptafluoropropane (HFC-227ea) and butane, cyclopropane, isobutane or propane to form an azeotropic or azeotrope-like composition.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is about 10 percent or less, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of effective amounts of difluoromethane (HFC-32) and isobutane, butane, propylene or cyclopropane; pentafluoroethane (HFC-125) and propylene or cyclopropane; 1,1,2,2-tetrafluoroethane (HFC-134) and propane; 1,1,1,2-tetrafluoroethane (HFC-134a) and cyclopropane; 1,1,1-trifluoroethane (HFC-143a) and propylene; 1,1-difluoroethane (HFC-152a) and propane, isobutane, butane and cyclopropane; fluoroethane (HFC-161) and propane or cyclopropane; 1,1,1,2,2,3,3-heptafluoropropane (HFC-227ca) and butane, cyclopropane, DME, isobutane or propane; or 1,1,1,2,3,3,3-heptafluoropropane (HFC-227ea) and butane, cyclopropane, isobutane or propane such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope that, for a maximum boiling azeotrope, have boiling points at a particular pressure higher than the pure components of the composition at that pressure and have vapor pressures lower at a particular temperature than the pure components of the composition at that temperature, and that, for a minimum boiling azeotrope, have boiling points at a particular pressure lower than the pure components of the composition at that pressure and have vapor pressures higher at a particular temperature than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that are substantially constant boiling. In those cases where the range of compositions that have maximum or minimum boiling temperatures at a particular pressure, or maximum or minimum vapor pressures at a particular temperature, are broader than the range of compositions that are substantially constant boiling according to the change in vapor pressure of the composition when 50 weight percent is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures at 25° C.

| COMPONENTS | PSIA | KPA |
|---|---|---|
| HFC-32 | 246.7 | 1701 |
| HFC-125 | 199.1 | 1373 |
| HFC-134 | 76.1 | 525 |
| HFC-134a | 98.3 | 677 |
| HFC-143a | 180.6 | 1245 |
| HFC-152a | 85.8 | 591 |
| HFC-161 | 130.2 | 898 |
| HFC-227ca | 63.8 | 440 |
| HFC-227ea | 66.6 | 459 |
| butane | 35.2 | 243 |
| cyclopropane | 105.0 | 724 |
| DME | 85.7 | 591 |
| isobutane | 50.5 | 348 |
| propane | 137.8 | 950 |
| propylene | 165.9 | 1144 |

Substantially constant boiling, azeotropic or azeotrope-like compositions of this invention comprise the following (all compositions are measured at 25° C.):

| COMPONENTS | WEIGHT RANGES (wt. %/wt. %) | PREFERRED (wt. %/wt. %) |
|---|---|---|
| HFC-32/isobutane | 61–99/1–39 | 70–99/1–30 |
| HFC-32/butane | 65–99/1–35 | 70–99/1–30 |
| HFC-32/propylene | 26–99/1–74 | 70–99/1–30 |
| HFC-32/cyclopropane | 54–99/1–46 | 54–99/1–46 |
| HFC-125/propylene | 1–99/1–99 | 60–99/1–40 |
| HFC-125/cyclopropane | 66–99/1–34 | 66–99/1–34 |
| HFC-134/propane | 1–75/25–99 | 30–75/25–70 |
| HFC-134a/cyclopropane | 1–99/1–99 | 50–99/1–50 |
| HFC-143a/propylene | 1–99/1–99 | 70–99/1–30 |
| HFC-152a/propane | 1–78/22–99 | 30–78/22–70 |
| HFC-152a/isobutane | 44–99/1–56 | 60–99/1–40 |
| HFC-152a/butane | 54–99/1–46 | 70–99/1–30 |
| HFC-152a/cyclopropane | 1–99/1–99 | 20–99/1–80 |
| HFC-161/propane | 1–99/1–99 | 20–99/1–80 |
| HFC-161/cyclopropane | 1–99/1–99 | 40–99/1–60 |
| HFC-227ca/butane | 61–99/1–39 | 70–99/1–30 |
| HFC-227ca/cyclopropane | 27–82/18–73 | 40–82/18–60 |
| HFC-227ca/DME | 1–92/8–99 | 60–92/8–40 |
| HFC-227ca/isobutane | 53–92/8–47 | 60–92/8–40 |
| HFC-227ca/propane | 1–79/21–99 | 30–79/21–70 |
| HFC-227ea/butane | 61–99/1–39 | 70–99/1–30 |
| HFC-227ea/cyclopropane | 24–83/17–76 | 40–83/17–60 |
| HFC-227ea/isobutane | 52–99/1–48 | 60–99/1–40 |
| HFC-227ea/propane | 1–79/21–99 | 40–79/21–60 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study shows the following composition is azeotropic. The temperature is 25° C.

| Composition | Weight Percents | Vapor Press. psia | kPa |
|---|---|---|---|
| HFC-32/isobutane | 93.8/6.2 | 249.6 | 1721 |
| HFC-32/butane | 99.0/1.0 | 246.8 | 1702 |
| HFC-32/propylene | 81.0/19.0 | 261.5 | 1803 |
| HFC-32/cyclopropane | 85.2/14.8 | 260.6 | 1797 |
| HFC-125/propylene | 79.5/20.5 | 229.1 | 1580 |
| HFC-125/cyclopropane | 91.3/8.7 | 209.6 | 1445 |
| HFC-134/propane | 52.3/47.7 | 164.3 | 1132 |
| HFC-134a/cyclopropane | 65.5/34.5 | 137.5 | 948 |
| HFC-143a/propylene | 89.6/10.4 | 181.2 | 1249 |
| HFC-152a/propane | 45.9/54.1 | 155.1 | 1069 |
| HFC-152a/isobutane | 75.5/24.5 | 97.0 | 669 |
| HFC-152a/butane | 85.0/15.0 | 90.5 | 624 |
| HFC-152a/cyclopropane | 44.3/55.7 | 117.8 | 812 |
| HFC-161/propane | 44.5/55.5 | 161.2 | 1111 |
| HFC-161/cyclopropane | 63.4/36.6 | 140.8 | 971 |
| HFC-227ca/butane | 84.4/15.6 | 77.5 | 534 |
| HFC-227ca/cyclopropane | 55.8/44.2 | 126.5 | 872 |
| HFC-227ca/DME | 75.6/24.4 | 101.0 | 696 |
| HFC-227ca/isobutane | 76.8/23.2 | 90.0 | 621 |
| HFC-227ca/propane | 51.6/48.4 | 159.8 | 1102 |
| HFC-227ea/butane | 85.8/14.2 | 76.8 | 530 |
| HFC-227ea/cyclopropane | 55.2/44.8 | 125.1 | 863 |
| HFC-227ea/isobutane | 77.6/22.4 | 88.8 | 612 |
| HFC-227ea/propane | 50.4/49.6 | 157.4 | 1085 |

EXAMPLE 2

Impact of Vapor Leakage on Vapor Pressure at 25° C.

A vessel is charged with an initial liquid composition at 25° C. The liquid, and the vapor above the liquid, are allowed to come to equilibrium, and the vapor pressure in the vessel is measured. Vapor is allowed to leak from the vessel, while the temperature is held constant at 25° C., until 50 weight percent of the initial charge is removed, at which time the vapor pressure of the composition remaining in the vessel is measured. The results are summarized below.

| Refrigerant Composition | 0 wt % evaporated psia | kPa | 50 wt % evaporated psia | kPa | 0% change in vapor pressure |
|---|---|---|---|---|---|
| HFC-32/isobutane | | | | | |
| 93.8/6.2 | 249.6 | 1721 | 249.6 | 1721 | 0.0 |
| 99/1 | 247.8 | 1709 | 247.5 | 1706 | 0.1 |
| 70/30 | 240.8 | 1660 | 230.3 | 1588 | 4.4 |
| 60/40 | 234.8 | 1619 | 209.6 | 1445 | 10.7 |
| 61/39 | 235.5 | 1624 | 212.3 | 1464 | 9.9 |
| HFC-32/butane | | | | | |
| 99.0/1.0 | 246.8 | 1702 | 246.8 | 1702 | 0.0 |
| 70/30 | 232.3 | 1602 | 217.4 | 1499 | 6.4 |
| 65/35 | 229.1 | 1580 | 206.6 | 1424 | 9.8 |
| HFC-32/propylene | | | | | |
| 81.0/19.0 | 261.5 | 1803 | 261.5 | 1803 | 0.0 |
| 99/1 | 248.8 | 1715 | 248.0 | 1710 | 0.3 |
| 70/30 | 259.3 | 1788 | 257.7 | 1777 | 0.6 |
| 60/40 | 254.3 | 1753 | 248.8 | 1715 | 2.2 |
| 50/50 | 246.7 | 1701 | 235.7 | 1625 | 4.5 |
| 40/60 | 236.6 | 1631 | 219.6 | 1514 | 7.2 |
| 30/70 | 223.8 | 1543 | 202.6 | 1397 | 9.5 |
| 29/71 | 222.3 | 1533 | 200.9 | 1385 | 9.6 |
| 27/73 | 219.3 | 1512 | 197.6 | 1362 | 9.9 |
| 26/74 | 217.8 | 1502 | 196.0 | 1351 | 10.0 |
| HFC-32/cyclopropane | | | | | |
| 85.2/14.8 | 260.6 | 1797 | 260.6 | 1797 | 0.0 |
| 99/1 | 249.3 | 1719 | 248.2 | 1711 | 0.4 |
| 60/40 | 250.5 | 1727 | 236.5 | 1631 | 5.6 |
| 54/46 | 246.0 | 1696 | 222.5 | 1534 | 9.6 |
| 53/47 | 245.2 | 1691 | 219.7 | 1515 | 10.4 |
| HFC-125/propylene | | | | | |
| 79.5/20.5 | 229.1 | 1580 | 229.1 | 1580 | 0.0 |
| 90/10 | 224.8 | 1550 | 222.4 | 1533 | 1.1 |
| 99/1 | 203.9 | 1406 | 201.8 | 1391 | 1.0 |
| 70/30 | 227.4 | 1568 | 225.9 | 1558 | 0.7 |
| 50/50 | 217.2 | 1498 | 206.5 | 1424 | 4.9 |
| 40/60 | 209.9 | 1447 | 194.1 | 1338 | 7.5 |
| 30/70 | 201.2 | 1387 | 183.1 | 1262 | 9.0 |
| 20/80 | 191.1 | 1318 | 174.8 | 1205 | 8.5 |
| 10/90 | 179.3 | 1236 | 169.3 | 1167 | 5.6 |
| 1/99 | 167.4 | 1154 | 166.2 | 1146 | 0.7 |
| HFC-125/cyclopropane | | | | | |
| 91.3/8.7 | 209.6 | 1445 | 209.6 | 1445 | 0.0 |
| 99/1 | 202.2 | 1394 | 201.3 | 1388 | 0.4 |
| 66/34 | 194.9 | 1344 | 176.5 | 1217 | 9.4 |
| 65/35 | 194.1 | 1338 | 174.2 | 1201 | 10.3 |
| HFC-134/propane | | | | | |
| 90/10 | 140.0 | 965 | 83.6 | 576 | 40.3 |
| 75.6/24.4 | 158.9 | 1095 | 143.0 | 986 | 10.0 |
| 52.3/47.7 | 164.3 | 1132 | 164.3 | 1132 | 0.0 |
| 25/75 | 157.3 | 1085 | 152.1 | 1049 | 3.3 |
| 1/99 | 138.5 | 955 | 137.8 | 950 | 0.5 |
| HFC-134a/cyclopropane | | | | | |
| 65.5/34.5 | 137.5 | 948 | 137.5 | 948 | 0.0 |
| 90/10 | 126.8 | 874 | 116.8 | 805 | 7.9 |
| 95/5 | 117.1 | 807 | 106.2 | 732 | 9.3 |
| 99/1 | 103.2 | 712 | 99.5 | 686 | 3.6 |
| 30/70 | 129.4 | 892 | 119.4 | 823 | 7.7 |
| 15/85 | 120.2 | 829 | 109.5 | 755 | 8.9 |
| 10/90 | 115.9 | 799 | 107.5 | 741 | 7.2 |
| 1/99 | 106.3 | 733 | 105.2 | 725 | 1.0 |
| HFC-143a/propylene | | | | | |
| 89.6/10.4 | 181.2 | 1249 | 181.2 | 1249 | 0.0 |
| 99/1 | 180.7 | 1246 | 180.7 | 1246 | 0.0 |
| 60/40 | 178.4 | 1230 | 178.1 | 1228 | 0.2 |
| 40/60 | 174.7 | 1205 | 174.2 | 1201 | 0.3 |
| 20/80 | 170.5 | 1176 | 170.0 | 1172 | 0.3 |
| 1/99 | 166.2 | 1146 | 166.1 | 1145 | 0.1 |

-continued

| Refrigerant Composition | 0 wt % evaporated psia | kPa | 50 wt % evaporated psia | kPa | 0% change in vapor pressure |
|---|---|---|---|---|---|
| HFC-152a/propane | | | | | |
| 45.9/54.1 | 155.1 | 1069 | 155.1 | 1069 | 0.0 |
| 60/40 | 153.7 | 1060 | 152.2 | 1049 | 1.0 |
| 70/30 | 151.0 | 1041 | 146.1 | 1007 | 3.2 |
| 78/22 | 147.5 | 1017 | 134.5 | 927 | 8.8 |
| 79/21 | 147.0 | 1014 | 131.9 | 909 | 10.3 |
| 30/70 | 153.2 | 1056 | 152.0 | 1048 | 0.8 |
| 20/80 | 149.9 | 1034 | 147.6 | 1018 | 1.5 |
| 10/90 | 144.8 | 998 | 142.6 | 983 | 1.5 |
| 1/99 | 138.6 | 956 | 138.2 | 953 | 0.3 |
| HFC-152a/isobutane | | | | | |
| 75.5/24.5 | 97.0 | 669 | 97.0 | 669 | 0.0 |
| 90/10 | 94.7 | 653 | 92.5 | 638 | 2.3 |
| 99/1 | 87.3 | 602 | 86.3 | 595 | 1.1 |
| 60/40 | 95.7 | 660 | 93.9 | 647 | 1.9 |
| 40/60 | 90.4 | 623 | 79.2 | 546 | 12.4 |
| 43/57 | 91.5 | 631 | 82.3 | 567 | 10.1 |
| 44/56 | 91.8 | 633 | 83.3 | 574 | 9.3 |
| HFC-152a/butane | | | | | |
| 85.0/15.0 | 90.5 | 624 | 90.5 | 624 | 0.0 |
| 95/5 | 88.9 | 613 | 88.2 | 608 | 0.8 |
| 99/1 | 86.6 | 597 | 86.2 | 594 | 0.5 |
| 70/30 | 89.0 | 614 | 87.4 | 603 | 1.8 |
| 60/40 | 87.1 | 601 | 82.4 | 568 | 5.4 |
| 53/47 | 85.3 | 588 | 76.7 | 529 | 10.1 |
| 54/46 | 85.6 | 590 | 77.6 | 535 | 9.3 |
| HFC-152a/cyclopropane | | | | | |
| 44.3/55.7 | 117.8 | 812 | 117.8 | 812 | 0.0 |
| 70/30 | 113.8 | 785 | 110.9 | 765 | 2.5 |
| 90/10 | 100.4 | 692 | 94.3 | 650 | 6.1 |
| 99/1 | 87.6 | 604 | 86.5 | 596 | 1.3 |
| 20/80 | 114.6 | 790 | 113.0 | 779 | 1.4 |
| 1/99 | 105.8 | 729 | 105.4 | 727 | 0.4 |
| HFC-161/propane | | | | | |
| 44.5/55.5 | 161.2 | 1111 | 161.2 | 1111 | 0.0 |
| 70/30 | 156.0 | 1076 | 153.2 | 1056 | 1.8 |
| 90/10 | 142.2 | 980 | 137.9 | 951 | 3.0 |
| 99/1 | 131.6 | 907 | 130.9 | 903 | 0.5 |
| 20/80 | 156.0 | 1076 | 153.2 | 1056 | 1.8 |
| 1/99 | 139.3 | 960 | 138.5 | 955 | 0.6 |
| HFC-161/cyclopropane | | | | | |
| 63.4/36.6 | 140.8 | 971 | 140.8 | 971 | 0.0 |
| 80/20 | 138.9 | 958 | 138.4 | 954 | 0.4 |
| 99/1 | 130.8 | 902 | 130.7 | 901 | 0.1 |
| 30/70 | 134.2 | 925 | 129.8 | 895 | 3.3 |
| 15/85 | 125.2 | 863 | 116.3 | 802 | 7.1 |
| 10/90 | 120.4 | 830 | 111.6 | 769 | 7.3 |
| 1/99 | 107.1 | 738 | 105.5 | 727 | 1.5 |
| HFC-227ca/butane | | | | | |
| 84.4/15.6 | 77.5 | 534 | 77.5 | 534 | 0.0 |
| 92/8 | 76.4 | 527 | 74.5 | 514 | 2.5 |
| 99/1 | 67.3 | 464 | 64.8 | 447 | 3.7 |
| 60/40 | 75.4 | 520 | 67.8 | 467 | 10.1 |
| 61/39 | 75.5 | 521 | 69.0 | 476 | 8.6 |
| HFC-227ca/cyclopropane | | | | | |
| 55.8/44.2 | 126.5 | 872 | 126.5 | 872 | 0.0 |
| 80/20 | 121.4 | 837 | 112.6 | 776 | 7.2 |
| 85/15 | 117.0 | 807 | 102.1 | 704 | 12.7 |
| 83/17 | 119.1 | 821 | 106.8 | 736 | 10.3 |
| 82/18 | 119.9 | 827 | 108.9 | 751 | 9.2 |
| 30/70 | 124.8 | 860 | 116.5 | 803 | 6.7 |
| 25/75 | 123.9 | 854 | 110.4 | 761 | 10.9 |
| 26/74 | 124.1 | 856 | 111.5 | 769 | 10.2 |
| 27/73 | 124.3 | 857 | 112.7 | 777 | 9.3 |
| HFC-227ca/DME | | | | | |
| 75.6/24.4 | 101.0 | 696 | 101.0 | 696 | 0.0 |
| 90/10 | 98.1 | 676 | 94.3 | 650 | 3.9 |
| 92/8 | 96.9 | 668 | 90.0 | 621 | 7.1 |
| 93/7 | 96.1 | 663 | 86.1 | 594 | 10.4 |
| 40/60 | 95.1 | 656 | 92.7 | 639 | 2.5 |
| 20/80 | 90.3 | 623 | 88.5 | 619 | 2.1 |
| 1/99 | 85.9 | 592 | 85.8 | 592 | 0.1 |
| HFC-227ca/isobutane | | | | | |
| 76.8/23.2 | 90.0 | 621 | 90.0 | 621 | 0.0 |
| 90/10 | 87.5 | 603 | 81.8 | 564 | 6.5 |
| 95/5 | 82.0 | 565 | 70.6 | 487 | 13.9 |
| 93/7 | 85.0 | 586 | 75.3 | 519 | 11.4 |
| 92/8 | 86.0 | 593 | 77.6 | 535 | 9.8 |
| 50/50 | 88.0 | 607 | 75.2 | 518 | 14.5 |
| 55/45 | 88.6 | 611 | 83.0 | 572 | 6.3 |
| 53/47 | 88.4 | 610 | 80.5 | 555 | 8.9 |
| 52/48 | 88.3 | 609 | 79.0 | 545 | 10.5 |
| HFC-227ca/propane | | | | | |
| 51.6/48.4 | 159.8 | 1102 | 159.8 | 1102 | 0.0 |
| 30/70 | 157.9 | 1089 | 152.1 | 1049 | 3.7 |
| 20/80 | 155.0 | 1069 | 143.8 | 991 | 7.2 |
| 15/85 | 152.6 | 1052 | 140.9 | 971 | 7.7 |
| 10/90 | 149.3 | 1029 | 139.2 | 960 | 6.8 |
| 1/99 | 139.4 | 961 | 137.9 | 951 | 1.1 |
| 80/20 | 153.6 | 1059 | 136.8 | 943 | 10.9 |
| 78/22 | 154.9 | 1068 | 142.2 | 980 | 8.2 |
| 79/21 | 154.3 | 1064 | 139.7 | 963 | 9.5 |
| HFC-227ea/butane | | | | | |
| 85.8/14.2 | 76.8 | 530 | 76.8 | 530 | 0.0 |
| 92/8 | 76.0 | 524 | 75.1 | 518 | 1.2 |
| 99/1 | 69.0 | 476 | 67.7 | 467 | 1.9 |
| 60/40 | 73.8 | 509 | 66.1 | 456 | 10.4 |
| 61/39 | 74.0 | 510 | 67.2 | 463 | 9.2 |
| HFC-227ea/cyclopropane | | | | | |
| 55.2/44.8 | 125.1 | 863 | 125.1 | 863 | 0.0 |
| 80/20 | 119.7 | 825 | 111.8 | 771 | 6.6 |
| 90/10 | 107.4 | 741 | 89.5 | 617 | 16.7 |
| 85/15 | 115.2 | 794 | 102.3 | 705 | 11.2 |
| 83/17 | 117.3 | 809 | 106.5 | 734 | 9.2 |
| 84/16 | 116.3 | 802 | 104.5 | 721 | 10.1 |
| 30/70 | 123.3 | 850 | 116.7 | 805 | 5.4 |
| 25/75 | 122.4 | 844 | 111.5 | 769 | 8.9 |
| 23/77 | 122.0 | 841 | 109.7 | 756 | 10.1 |
| 24/76 | 122.2 | 843 | 110.6 | 763 | 9.5 |
| HFC-227ea/isobutane | | | | | |
| 77.6/22.4 | 88.8 | 612 | 88.8 | 612 | 0.0 |
| 85/15 | 88.2 | 608 | 87.1 | 601 | 1.2 |
| 99/1 | 71.0 | 490 | 67.6 | 466 | 4.8 |
| 50/50 | 86.3 | 595 | 74.9 | 516 | 13.2 |
| 55/45 | 87.0 | 600 | 81.5 | 562 | 6.3 |
| 53/47 | 86.8 | 598 | 79.4 | 547 | 8.5 |
| 52/48 | 86.6 | 597 | 78.1 | 538 | 9.8 |
| HFC-227ea/propane | | | | | |
| 50.4/49.6 | 157.4 | 1085 | 157.4 | 1085 | 0.0 |
| 70/30 | 155.2 | 1070 | 150.8 | 1040 | 2.8 |
| 90/10 | 133.7 | 922 | 91.5 | 631 | 31.6 |
| 80/20 | 150.0 | 1034 | 133.6 | 921 | 10.9 |
| 79/21 | 150.8 | 1040 | 136.3 | 940 | 9.6 |
| 30/70 | 155.7 | 1074 | 151.4 | 1044 | 2.8 |
| 20/80 | 153.0 | 1055 | 144.3 | 995 | 5.7 |
| 10/90 | 147.8 | 1019 | 139.6 | 963 | 5.5 |
| 1/99 | 139.1 | 959 | 137.9 | 951 | 0.9 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage at 0° C.

A leak test is performed on compositions of HFC-32 and cyclopropane, at the temperature of 0° C. The results are summarized below.

| Refrigerant Composition | 0 wt % evaporated psia | kPa | 50 wt % evaporated psia | kPa | 0% change in vapor pressure |
|---|---|---|---|---|---|
| HFC-32/cyclopropane | | | | | |
| 83.7/16.3 | 126.6 | 873 | 126.6 | 873 | 0.0 |
| 99/1 | 119.7 | 825 | 118.9 | 820 | 0.7 |
| 60/40 | 122.5 | 845 | 116.4 | 803 | 5.0 |
| 53/47 | 120.2 | 829 | 108.5 | 748 | 9.7 |
| 52/48 | 119.8 | 826 | 107.1 | 738 | 10.6 |

EXAMPLE 4

Refrigerant Performance

The following table shows the performance of various refrigerants in an ideal vapor compression cycle. The data are based on the following conditions.

| | |
|---|---|
| Evaporator temperature | 48.0'F (8.9'C) |
| Condenser temperature | 115.0'F (46.1'C) |
| Liquid subcooled to | 120'F (6.7'C) |
| Return Gas | 65'F (18.3'C) |
| Compressor efficiency is 75%. | |

The refrigeration capacity is based on a compressor with a fixed displacement of 3.5 cubic feet per minute and 75% volumetric efficiency. Capacity is intended to mean the change in enthalpy of the refrigerant in the evaporator per pound of refrigerant circulated, i.e. the heat removed by the refrigerant in the evaporator per time. Coefficient of performance (COP) is intended to mean the ratio of the capacity to compressor work. It is a measure of refrigerant energy efficiency.

| Refrig. Comp. | Evap. Press. Psia | kPa | Cond. Press. Psia | kPa | Comp. Dis. Temp. F | C | COP | Capacity BTU/min | kw |
|---|---|---|---|---|---|---|---|---|---|
| HFC-32/isobutane | | | | | | | | | |
| 1.0/99.0 | 32 | 221 | 93 | 641 | 135 | 57 | 4.91 | 148 | 2.6 |
| 93.8/6.2 | 154 | 1062 | 409 | 2820 | 205 | 96 | 4.32 | 605 | 10.7 |
| 99.0/1.0 | 155 | 1069 | 416 | 2868 | 214 | 101 | 4.33 | 623 | 11.0 |
| HFC-32/butane | | | | | | | | | |
| 1.0/99.0 | 22 | 152 | 68 | 469 | 137 | 58 | 5.03 | 110 | 1.9 |
| 99.0/1.0 | 154 | 1062 | 413 | 2848 | 214 | 101 | 4.34 | 621 | 10.9 |
| HFC-32/propylene | | | | | | | | | |
| 1.0/99.0 | 110 | 758 | 276 | 1903 | 162 | 72 | 4.50 | 403 | 7.1 |
| 81.0/19.0 | 163 | 1124 | 422 | 2910 | 197 | 92 | 4.25 | 609 | 10.7 |
| 99.0/1.0 | 156 | 1076 | 418 | 2882 | 215 | 102 | 4.32 | 626 | 11.0 |
| HFC-32/cyclopropane | | | | | | | | | |
| 1/99 | 68 | 469 | 183 | 1262 | 175 | 79 | 4.89 | 299 | 5.3 |
| 85.2/14.8 | 163 | 1124 | 425 | 2930 | 203 | 95 | 4.28 | 622 | 11.0 |
| 99/1 | 156 | 1076 | 419 | 2889 | 215 | 102 | 4.32 | 628 | 11.1 |
| HFC-125/propylene | | | | | | | | | |
| 1.0/99.0 | 109 | 752 | 275 | 1896 | 161 | 72 | 4.49 | 400 | 7.0 |
| 79.5/20.5 | 124 | 855 | 318 | 2193 | 149 | 65 | 4.12 | 413 | 7.3 |
| 99.0/1.0 | 128 | 883 | 337 | 2324 | 144 | 62 | 3.84 | 401 | 7.1 |
| HFC-125/cyclopropane | | | | | | | | | |
| 1/99 | 67 | 462 | 180 | 1241 | 175 | 79 | 4.85 | 293 | 5.2 |
| 91.3/8.7 | 133 | 917 | 343 | 2365 | 147 | 64 | 3.92 | 421 | 7.4 |
| 99/1 | 129 | 889 | 340 | 2344 | 144 | 62 | 3.83 | 402 | 7.1 |
| HFC-134/propane | | | | | | | | | |
| 1.0/99.0 | 90 | 621 | 232 | 1586 | 150 | 66 | 4.52 | 336 | 5.9 |
| 52.3/47.7 | 107 | 738 | 270 | 1862 | 148 | 64 | 4.37 | 375 | 6.6 |
| 99.0/1.0 | 50 | 345 | 149 | 1020 | 150 | 66 | 5.04 | 243 | 4.3 |
| HFC-134a/cyclopropane | | | | | | | | | |
| 1/99 | 66 | 455 | 180 | 1241 | 175 | 79 | 4.85 | 292 | 5.1 |
| 65.5/34.5 | 86 | 593 | 229 | 1579 | 159 | 71 | 4.61 | 344 | 6.1 |
| 99/1 | 60 | 414 | 177 | 1220 | 151 | 66 | 4.69 | 269 | 4.7 |
| HFC-143a/DME | | | | | | | | | |
| 1.0/99.0 | 52 | 357 | 150 | 1034 | 168 | 75 | 4.91 | 243 | 4.3 |
| 90.9/9.1 | 116 | 801 | 302 | 2084 | 183 | 84 | 4.29 | 429 | 7.6 |
| 99.0/1.0 | 118 | 813 | 322 | 2221 | 194 | 90 | 3.93 | 422 | 7.4 |

-continued

| Refrig. Comp. | Evap. Press. Psia | kPa | Cond. Press. Psia | kPa | Comp. Dis. Temp. F | °C | COP | Capacity BTU/min | kw |
|---|---|---|---|---|---|---|---|---|---|
| HFC-143a/propylene | | | | | | | | | |
| 1.0/99.0 | 109 | 752 | 274 | 1889 | 161 | 72 | 4.50 | 400 | 7.0 |
| 89.6/10.4 | 115 | 793 | 298 | 2055 | 155 | 68 | 4.28 | 408 | 7.2 |
| 99.0/1.0 | 115 | 793 | 301 | 2075 | 155 | 68 | 4.24 | 406 | 7.1 |
| HFC-152a/propane | | | | | | | | | |
| 1.0/99.0 | 89 | 614 | 229 | 1579 | 150 | 66 | 4.54 | 333 | 5.9 |
| 45.9/54.1 | 79 | 545 | 211 | 1455 | 156 | 69 | 4.63 | 317 | 5.6 |
| 99.0/1.0 | 52 | 359 | 156 | 1076 | 168 | 76 | 4.82 | 248 | 4.4 |
| HFC-152a/isobutane | | | | | | | | | |
| 1.0/99.0 | 31 | 214 | 91 | 627 | 135 | 57 | 4.78 | 139 | 2.4 |
| 75.5/24.5 | 49 | 338 | 142 | 979 | 156 | 69 | 4.80 | 222 | 3.9 |
| 99.0/1.0 | 52 | 359 | 154 | 1062 | 167 | 75 | 4.81 | 245 | 4.3 |
| HFC-152a/butane | | | | | | | | | |
| 1.0/99.0 | 21 | 145 | 65 | 448 | 138 | 59 | 4.89 | 103 | 1.8 |
| 85.0/15.0 | 45 | 310 | 135 | 931 | 162 | 72 | 4.87 | 215 | 3.8 |
| 99.0/1.0 | 51 | 352 | 153 | 1055 | 168 | 76 | 4.82 | 243 | 4.3 |
| HFC-152a/cyclopropane | | | | | | | | | |
| 1.0/99.0 | 66 | 455 | 179 | 1234 | 175 | 79 | 4.84 | 290 | 5.1 |
| 44.3/55.7 | 60 | 414 | 169 | 1165 | 173 | 78 | 4.83 | 272 | 4.8 |
| 99.0/1.0 | 52 | 359 | 155 | 1069 | 168 | 76 | 4.82 | 246 | 4.3 |
| HFC-161/propane | | | | | | | | | |
| 1.0/99.0 | 90 | 621 | 229 | 1579 | 150 | 66 | 4.53 | 334 | 5.9 |
| 44.5/55.5 | 94 | 648 | 244 | 1682 | 159 | 71 | 4.56 | 361 | 6.4 |
| 99.0/1.0 | 83 | 572 | 229 | 1579 | 175 | 79 | 4.69 | 356 | 6.3 |
| HFC-161/cyclopropane | | | | | | | | | |
| 1.0/99.0 | 66 | 455 | 178 | 1227 | 174 | 79 | 4.87 | 289 | 5.1 |
| 63.4/36.6 | 75 | 517 | 206 | 1420 | 174 | 79 | 4.79 | 328 | 5.8 |
| 99.0/1.0 | 84 | 579 | 230 | 1586 | 174 | 79 | 4.70 | 357 | 6.3 |
| HFC-227ca/butane | | | | | | | | | |
| 1.0/99.0 | 21 | 145 | 65 | 448 | 137 | 58 | 4.89 | 103 | 1.8 |
| 84.4/15.6 | 34 | 234 | 103 | 710 | 129 | 54 | 4.61 | 149 | 2.6 |
| 99.0/1.0 | 38 | 262 | 115 | 793 | 127 | 53 | 4.45 | 160 | 2.8 |
| HFC-227ca/cyclopropane | | | | | | | | | |
| 1.0/99.0 | 66 | 455 | 177 | 1220 | 174 | 79 | 4.88 | 289 | 5.1 |
| 55.8/44.2 | 76 | 524 | 202 | 1393 | 154 | 68 | 4.65 | 303 | 5.3 |
| 99.0/1.0 | 40 | 276 | 124 | 855 | 130 | 54 | 4.24 | 164 | 2.9 |
| HFC-227ca/DME | | | | | | | | | |
| 1.0/99.0 | 52 | 359 | 149 | 1027 | 167 | 75 | 4.90 | 242 | 4.3 |
| 75.6/24.4 | 66 | 455 | 184 | 1267 | 142 | 61 | 4.48 | 260 | 4.6 |
| 99.0/1.0 | 41 | 283 | 122 | 841 | 128 | 53 | 4.49 | 170 | 3.0 |
| HFC-227ca/isobutane | | | | | | | | | |
| 1.0/99.0 | 31 | 214 | 90 | 621 | 135 | 57 | 4.79 | 138 | 2.4 |
| 76.8/23.2 | 36 | 248 | 106 | 731 | 130 | 54 | 4.61 | 155 | 2.7 |
| 99.0/1.0 | 38 | 262 | 115 | 793 | 127 | 53 | 4.45 | 160 | 2.8 |
| HFC-227ca/propane | | | | | | | | | |
| 1.0/99.0 | 88 | 607 | 226 | 1558 | 145 | 63 | 4.53 | 326 | 5.7 |
| 51.6/48.4 | 76 | 524 | 205 | 1413 | 141 | 61 | 4.46 | 288 | 5.1 |
| 99.0/1.0 | 40 | 276 | 120 | 827 | 127 | 53 | 4.47 | 167 | 2.9 |
| HFC-227ea/butane | | | | | | | | | |
| 1.0/99.0 | 21 | 145 | 65 | 448 | 137 | 58 | 4.90 | 103 | 1.8 |
| 85.8/14.2 | 34 | 234 | 102 | 703 | 129 | 54 | 4.60 | 148 | 2.6 |
| 99.0/1.0 | 37 | 255 | 113 | 779 | 127 | 53 | 4.46 | 157 | 2.8 |
| HFC-227ea/cyclopropane | | | | | | | | | |
| 1.0/99.0 | 66 | 455 | 179 | 1234 | 175 | 79 | 4.85 | 291 | 5.1 |
| 55.2/44.8 | 75 | 517 | 201 | 1386 | 154 | 68 | 4.61 | 300 | 5.3 |
| 99.0/1.0 | 42 | 290 | 125 | 862 | 128 | 53 | 4.45 | 173 | 3.0 |
| HFC-227ea/isobutane | | | | | | | | | |
| 1.0/99.0 | 31 | 214 | 89 | 614 | 135 | 57 | 4.79 | 138 | 2.4 |
| 77.6/22.4 | 36 | 248 | 105 | 724 | 130 | 54 | 4.60 | 153 | 2.7 |
| 99.0/1.0 | 38 | 262 | 113 | 779 | 127 | 53 | 4.46 | 157 | 2.8 |

-continued

| Refrig.<br>Comp. | Evap. Press. | | Cond. Press. | | Comp. Dis. | | COP | Capacity BTU/min |  |
|---|---|---|---|---|---|---|---|---|---|
| | Psia | kPa | Psia | kPa | Temp. F | C | | kw | |
| HFC-227ea/propane | | | | | | | | | |
| 1.0/99.0 | 88 | 607 | 226 | 1558 | 145 | 63 | 4.53 | 326 | 5.7 |
| 50.4/49.6 | 76 | 524 | 204 | 1407 | 141 | 61 | 4.47 | 288 | 5.1 |
| 99.0/1.0 | 39 | 269 | 119 | 820 | 129 | 54 | 4.35 | 160 | 2.8 |

EXAMPLE 5

This Example is directed to measurements of the vapor pressure of the following liquid mixtures of this invention at 25° C.: HFC-32/isobutane; HFC-32/butane; HFC-32/propylene; HFC-125/propylene; HFC-143a/propylene; HFC-152a/propane; HFC-152a/isobutane; HFC-152a/butane; HFC-152a/cyclopropane; HFC-161/propane; HFC-161 /cyclopropane; HFC-227ca/butane; HFC-227ca/cyclopropane; HFC-227ca/DME; HFC-227ca/isobutane; HFC-227ca/propane; HFC-227ea/butane; HFC-227ea/cyclopropane; HFC-227ea/isobutane; and HFC-227ea/propane. The vapor pressures for these mixtures are shown in FIGS. 1–3, 5 and 9–24.

The vapor pressure data for the graph in FIG. 1 are obtained as follows. A stainless steel cylinder is evacuated, and a weighed amount of HFC-32 is added to the cylinder. The cylinder is cooled to reduce the vapor pressure of HFC-32, and then a weighed amount of isobutane is added to the cylinder. The cylinder is agitated to mix the HFC-32 and isobutane, and then the cylinder is placed in a constant temperature bath until the temperature comes to equilibrium, at which time the vapor pressure of the HFC-32 and isobutane in the cylinder is measured. This procedure is repeated at the same temperature with different weight percents of the components, and the results are plotted in FIG. 1.

Data are obtained in the same way for the mixtures plotted in FIGS. 2, 3, 5 and 9–24.

The data in FIGS. 1–3, 5 and 9–24 show that at 25° C., there are ranges of compositions that have vapor pressures higher than the vapor pressures of the pure components of the composition at that same temperature.

EXAMPLE 6

This Example is directed to the measurements of the vapor pressure of the following liquid mixtures of this invention: HFC-32/cyclopropane; HFC-125/cyclopropane; HFC-134/propane; and HFC-134a/cyclopropane. The vapor pressures of these mixtures were measured at particular compositions as shown by the asterisks in FIG. 4 and 6–8, and a best fit curve was drawn through the asterisks.

The procedure for measuring the vapor pressures for mixtures of HFC-32 and cyclopropane was as follows. A stainless steel cylinder was evacuated, and a weighed amount of HFC-32 was added to the cylinder. The cylinder was cooled to reduce the vapor pressure of HFC-32, and then a weighed amount of cyclopropane was added to the cylinder. The cylinder was agitated to mix the HFC-32 and cyclopropane, and then the cylinder was placed in a constant temperature bath until the temperature came to equilibrium at 0° C., at which time the vapor pressure of the content of the cylinder was measured. This procedure was repeated for various mixtures of HFC-32 and cyclopropane as indicated in FIG. 4.

Figure 4:
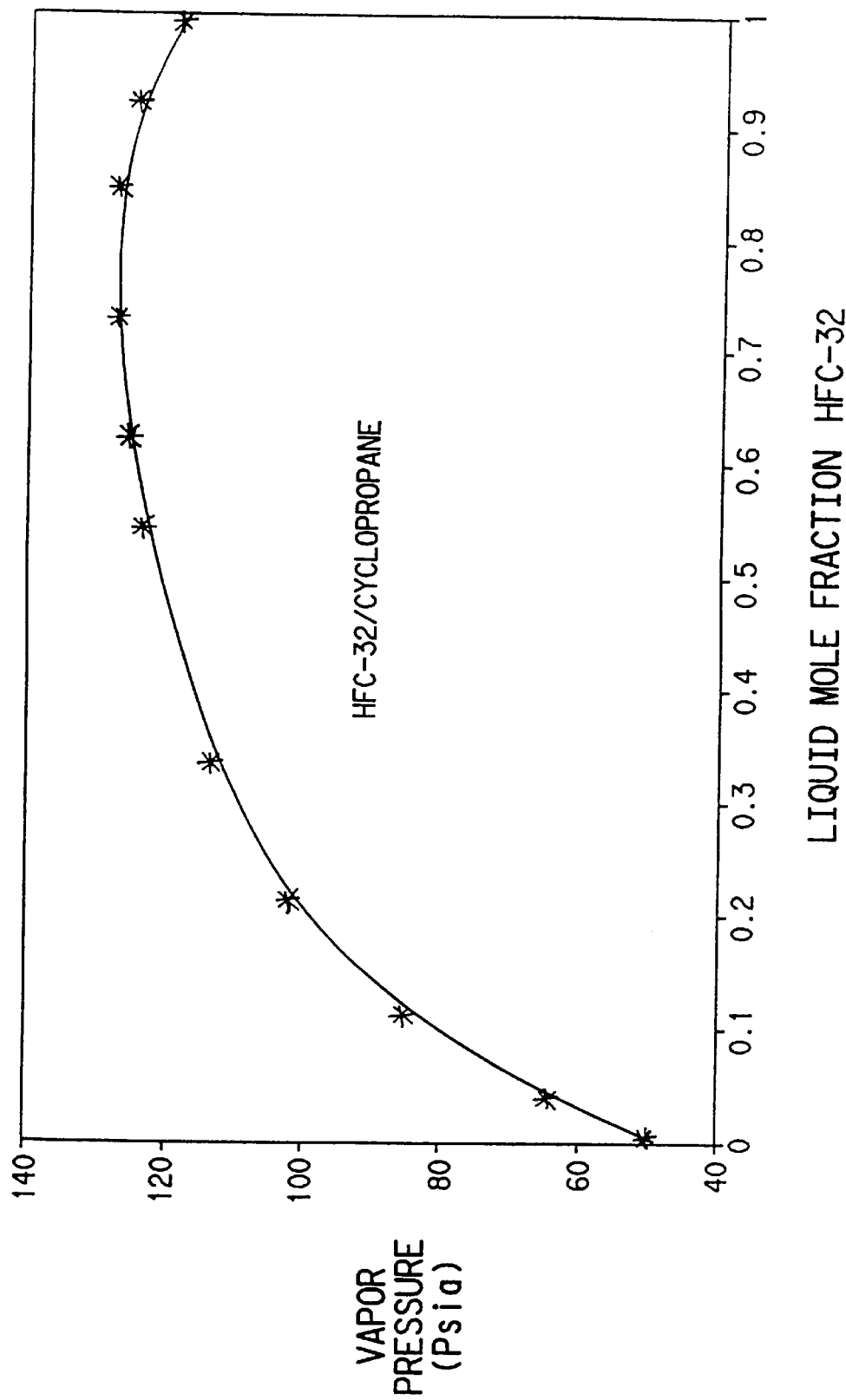
FIG. 4 is a graph of the vapor pressure of liquid mixtures of HFC-32 and cyclopropane at 0° C.
Figure 5:
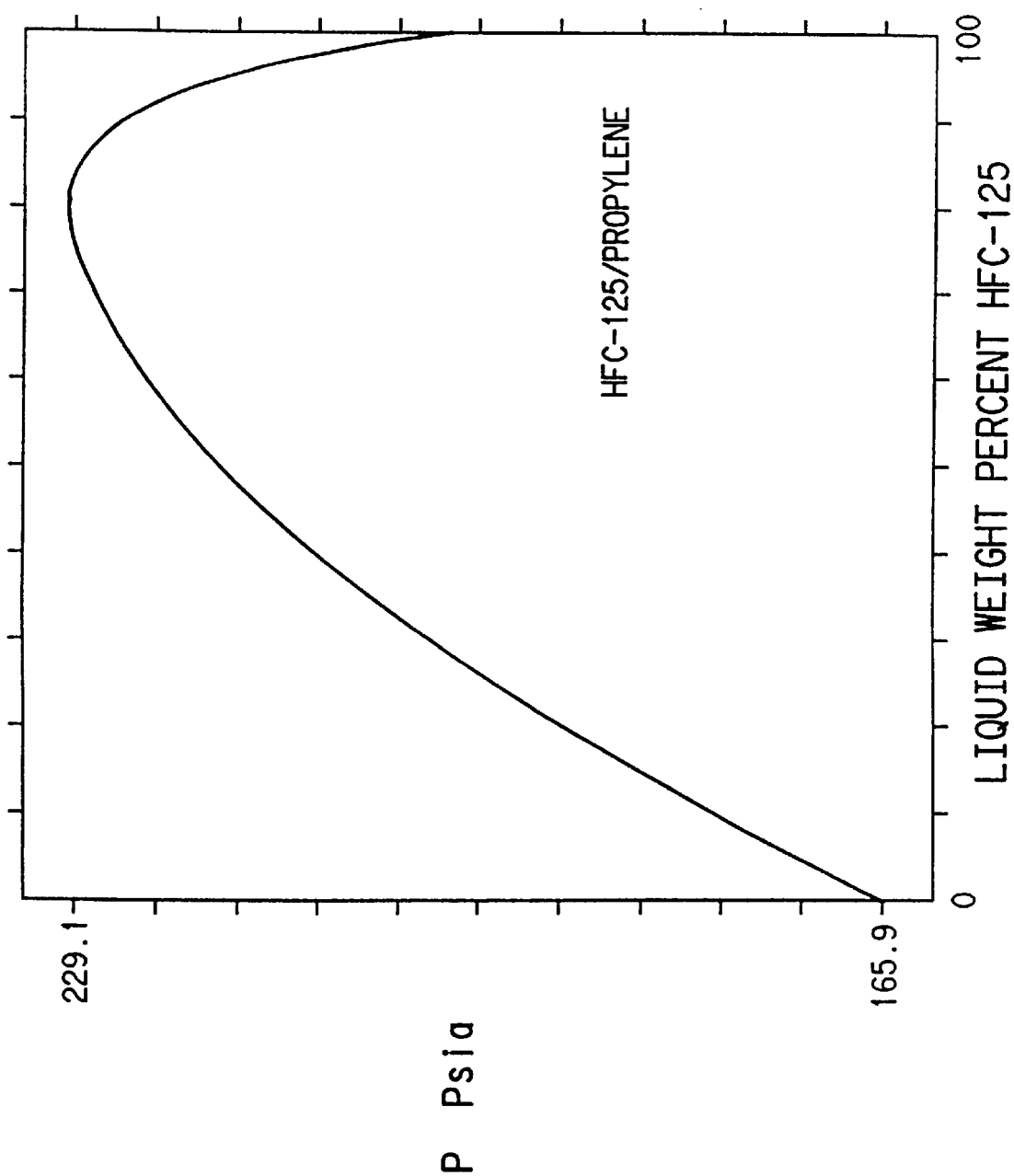
FIG. 5 is a graph of the vapor pressure of liquid mixtures of HFC-125 and propylene at 25° C.
Figure 6:
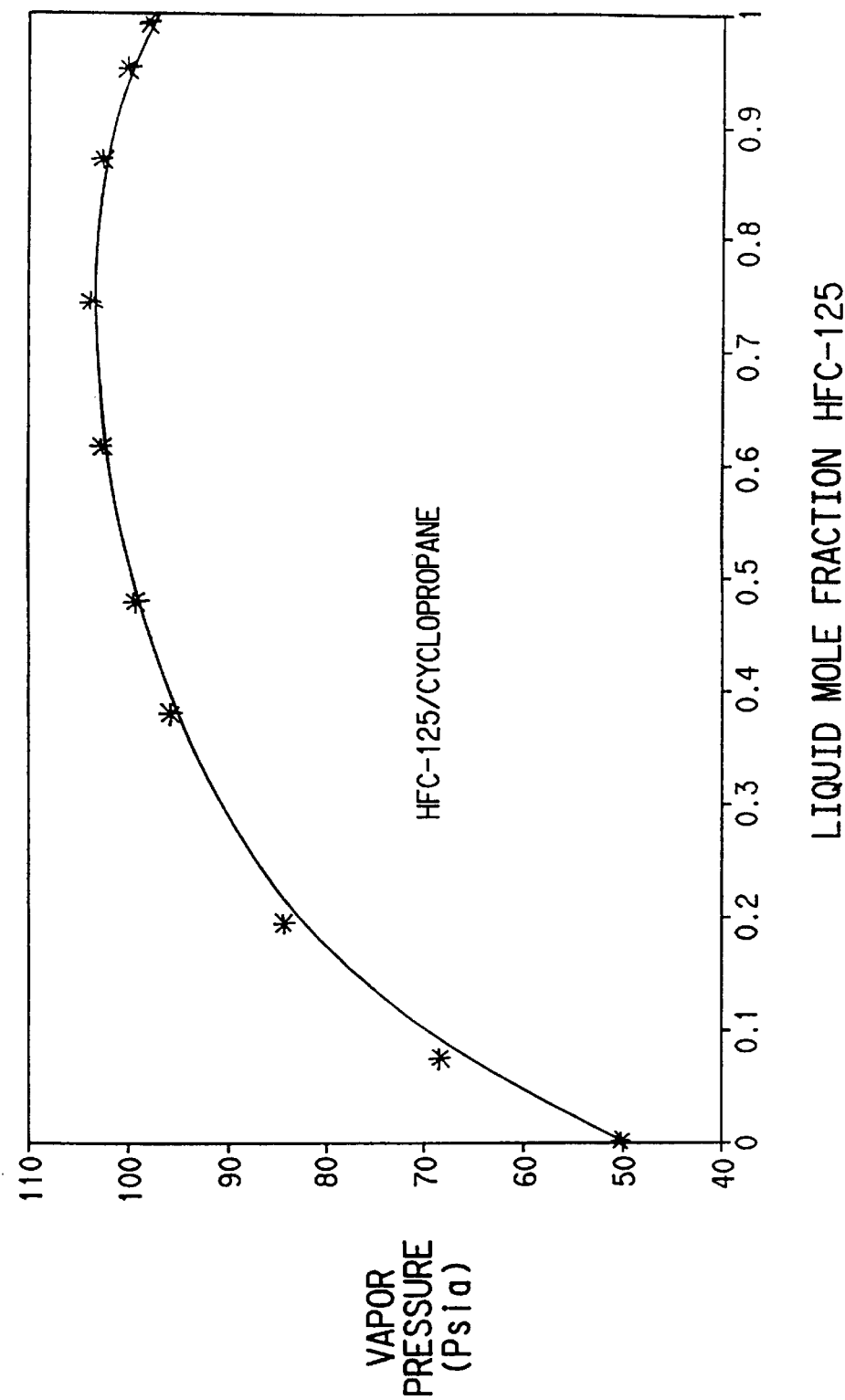
FIG. 6 is a graph of the vapor pressure of liquid mixtures of HFC-125 and cyclopropane at 0° C.
Figure 7:
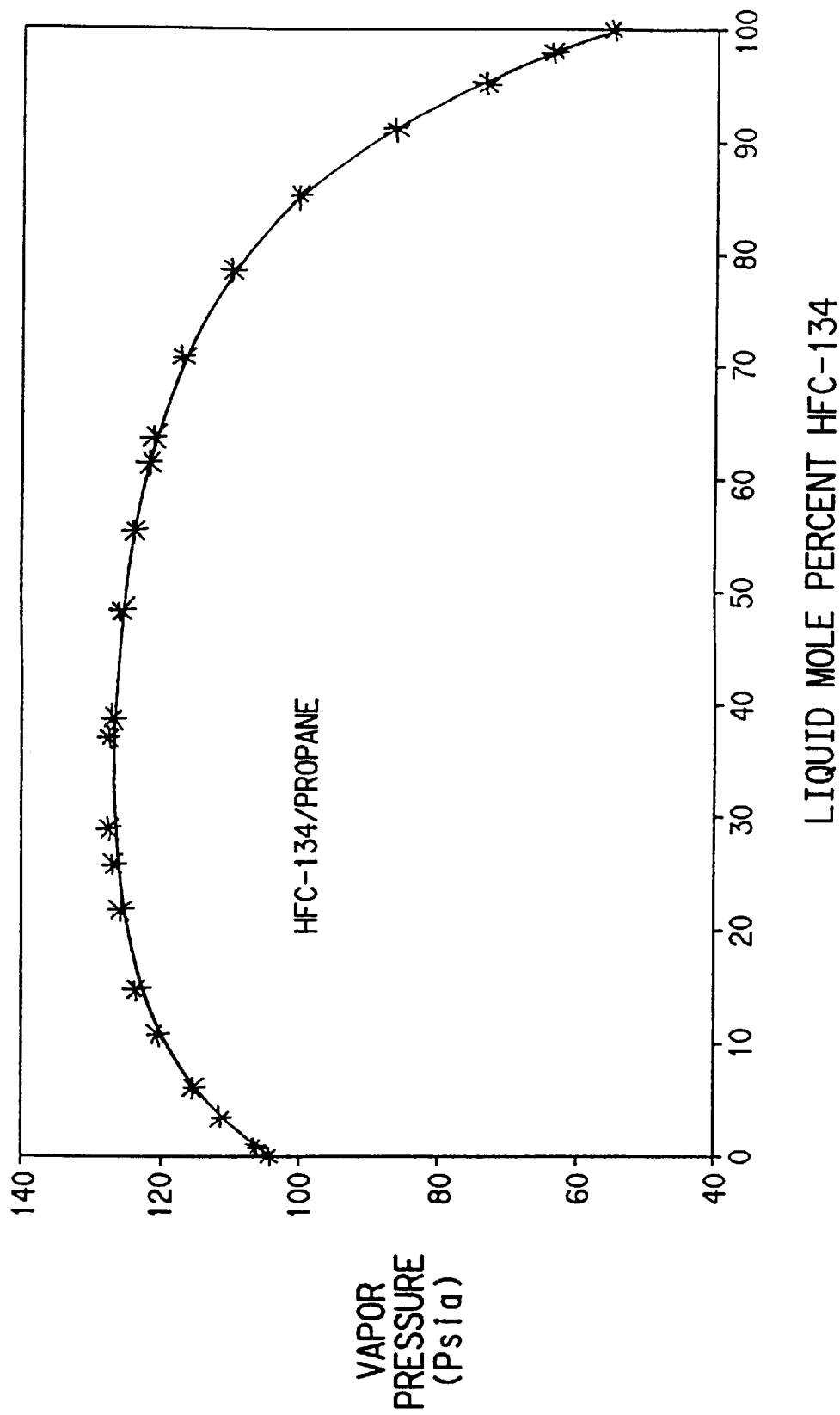
FIG. 7 is a graph of the vapor pressure of liquid mixtures of HFC-134 and propane at 15° C.
Figure 8:
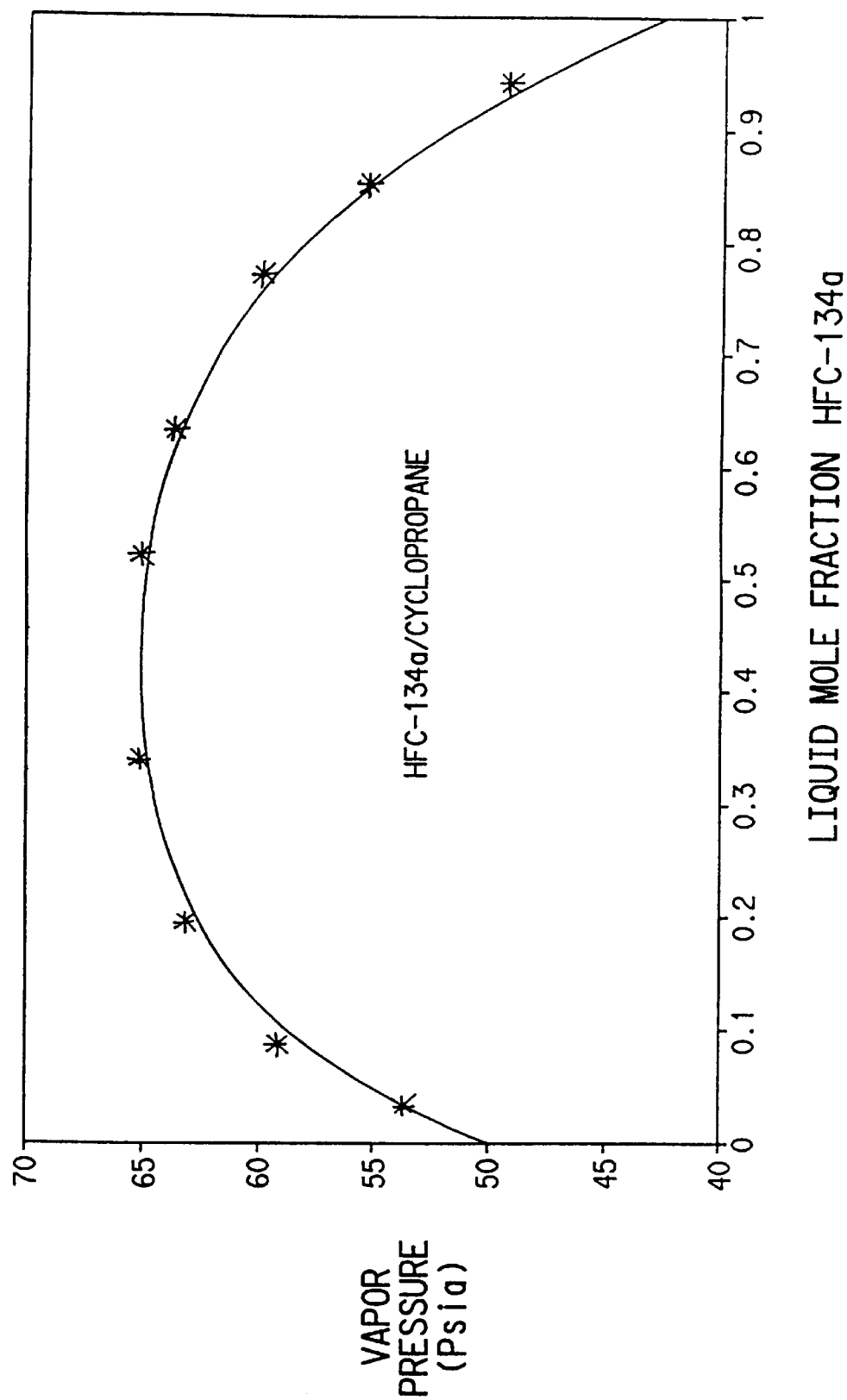
FIG. 8 is a graph of the vapor pressure of liquid mixtures of HFC-134a and cyclopropane at 0.01° C.
Figure 9:
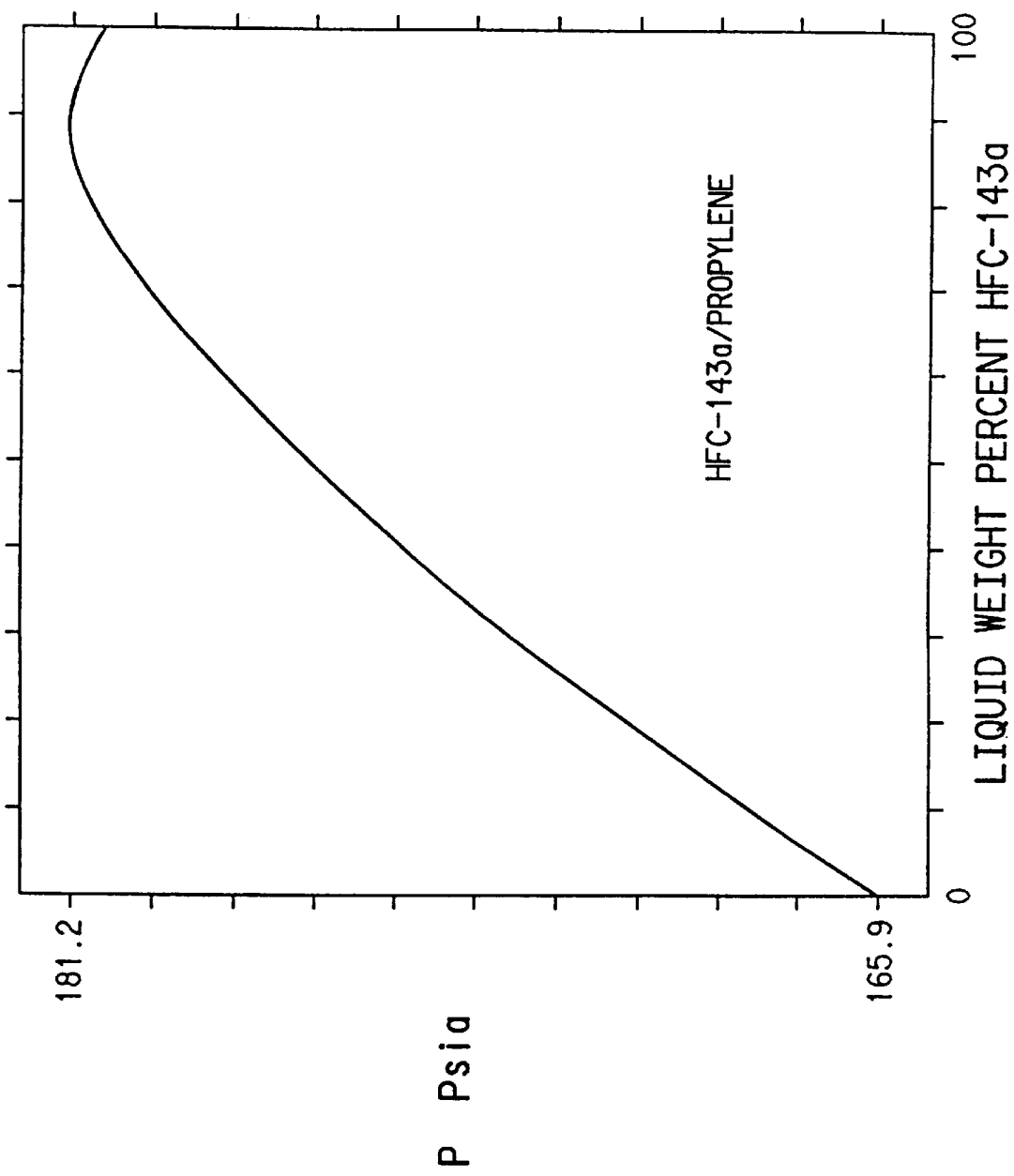
FIG. 9 is a graph of the vapor pressure of liquid mixtures of HFC-143a and propylene at 25° C.
Figure 10:
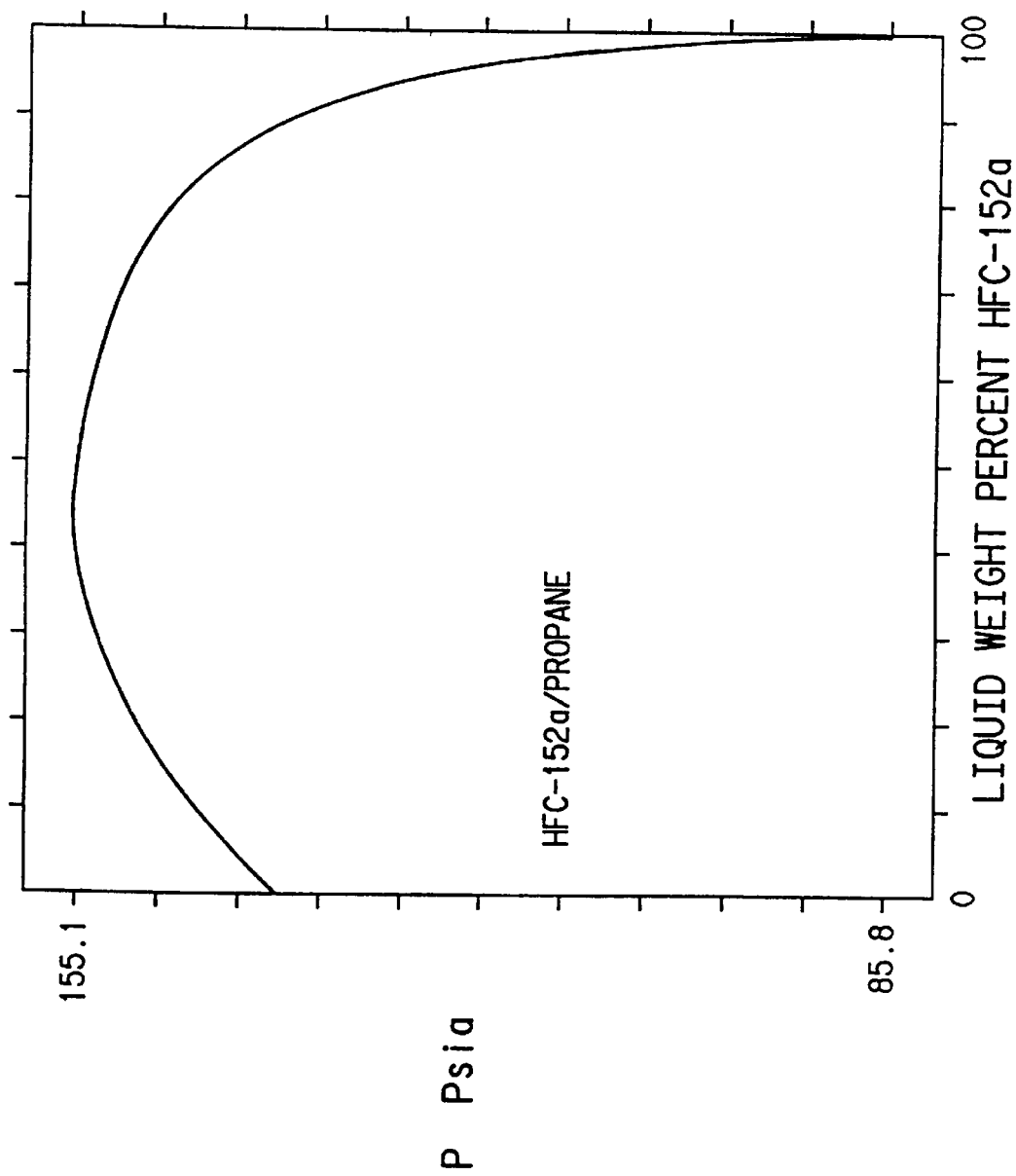
FIG. 10 is a graph of the vapor pressure of liquid mixtures of HFC-152a and propane at 25° C.
Figure 11:
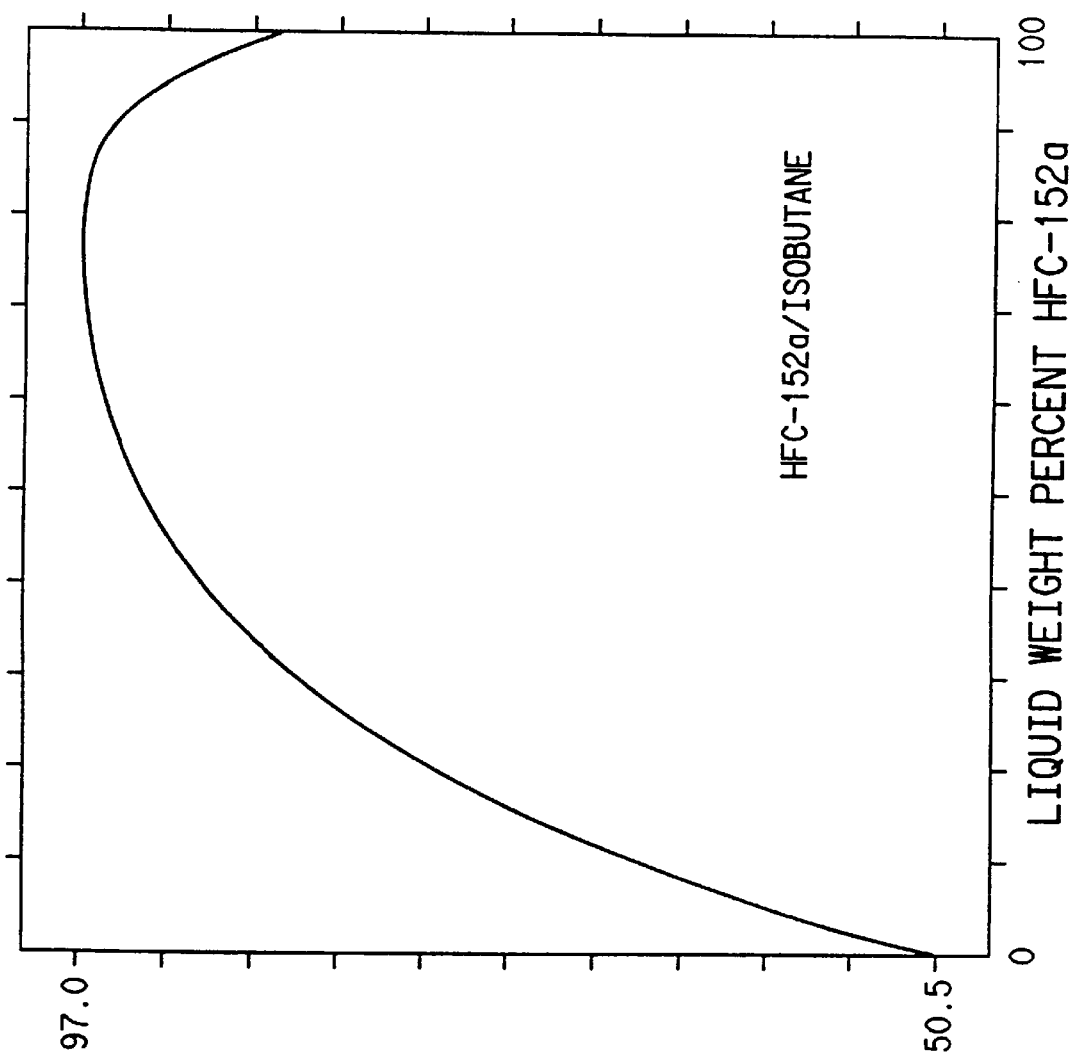
FIG. 11 is a graph of the vapor pressure of liquid mixtures of HFC-152a and isobutane at 25° C.
Figure 12:
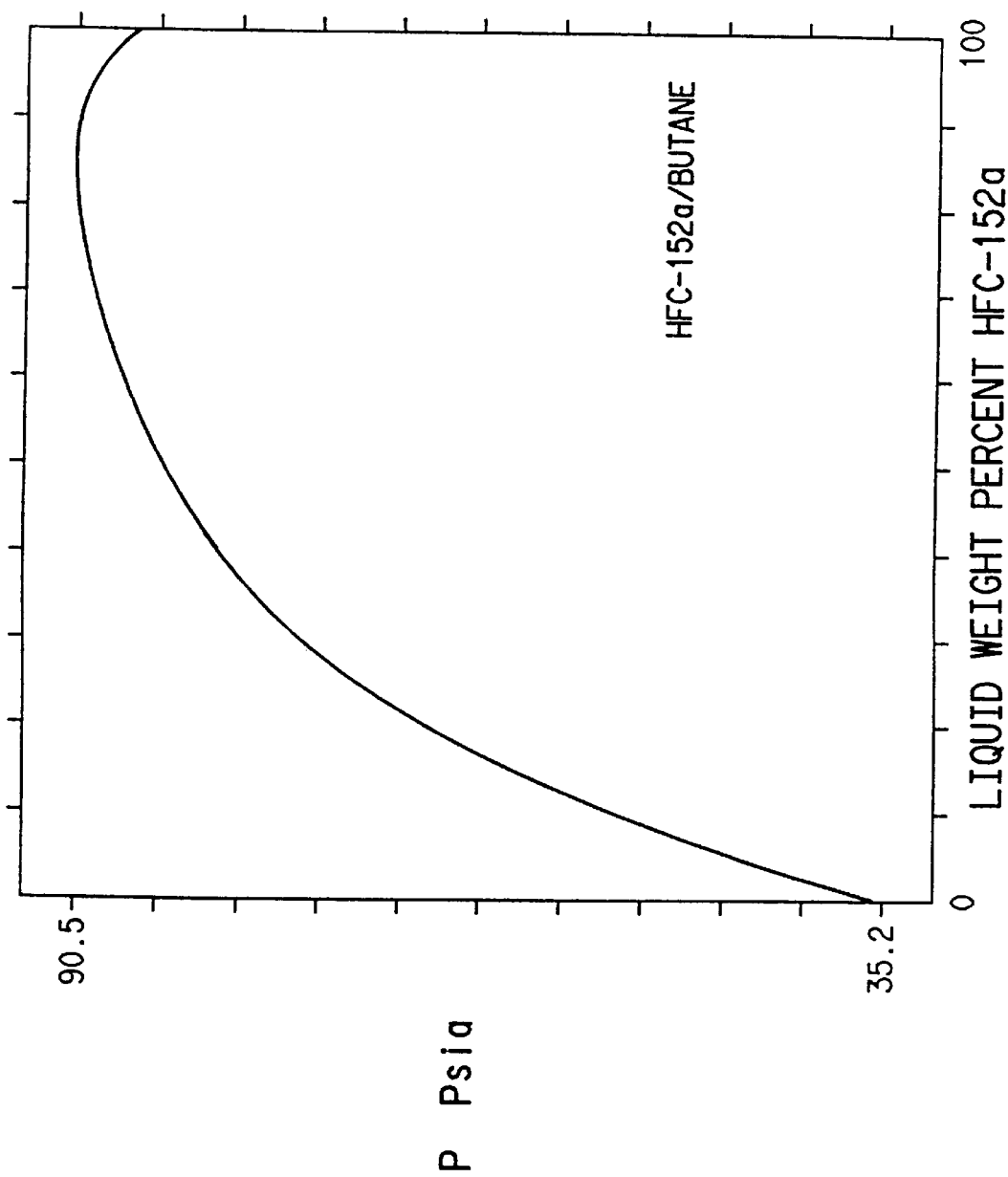
FIG. 12 is a graph of the vapor pressure of liquid mixtures of HFC-152a and butane at 25° C.
Figure 13:
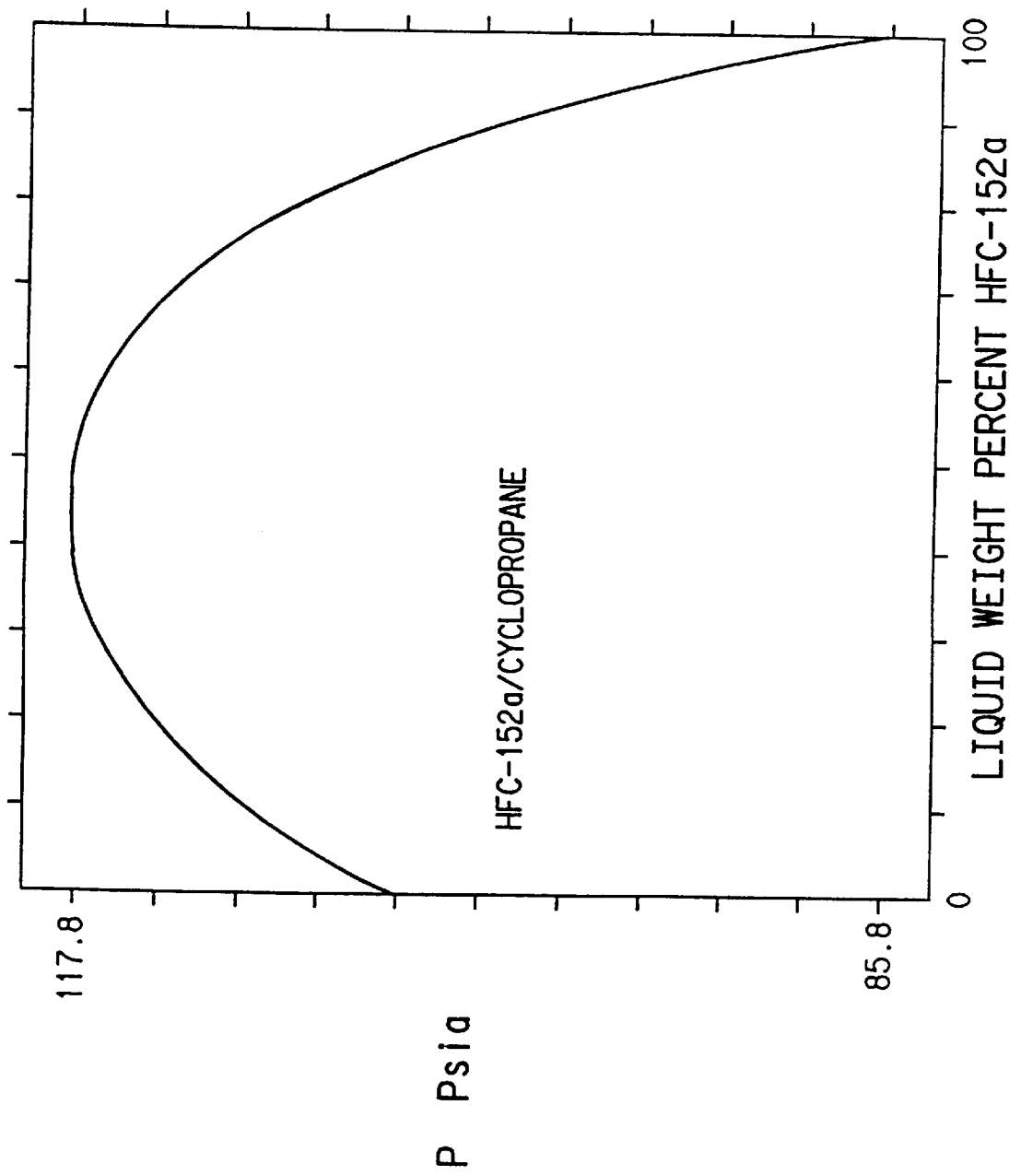
FIG. 13 is a graph of the vapor pressure of liquid mixtures of HFC-152a and cyclopropane at 25° C.
Figure 14:
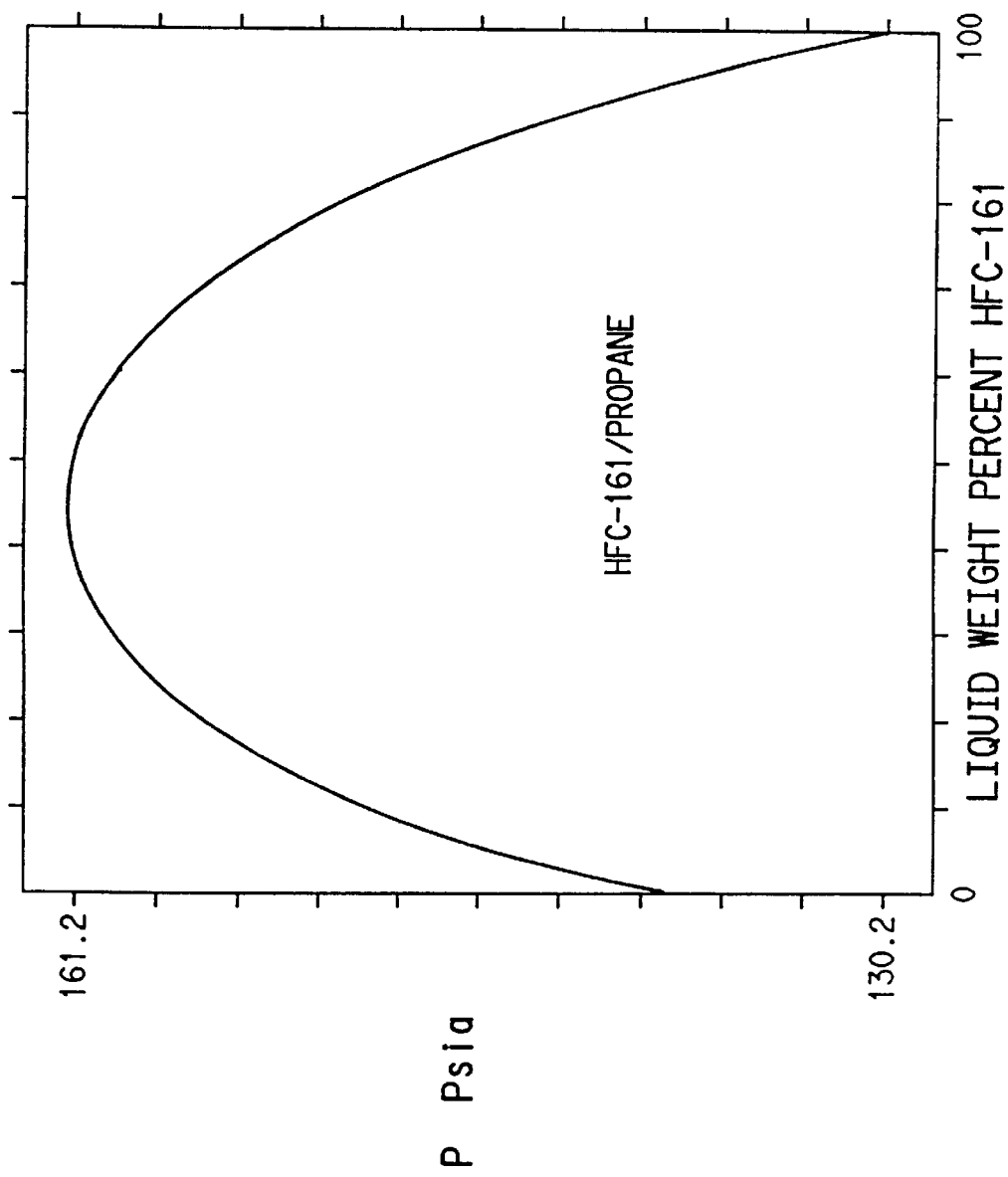
FIG. 14 is a graph of the vapor pressure of liquid mixtures of HFC-161 and propane at 25° C.
Figure 15:
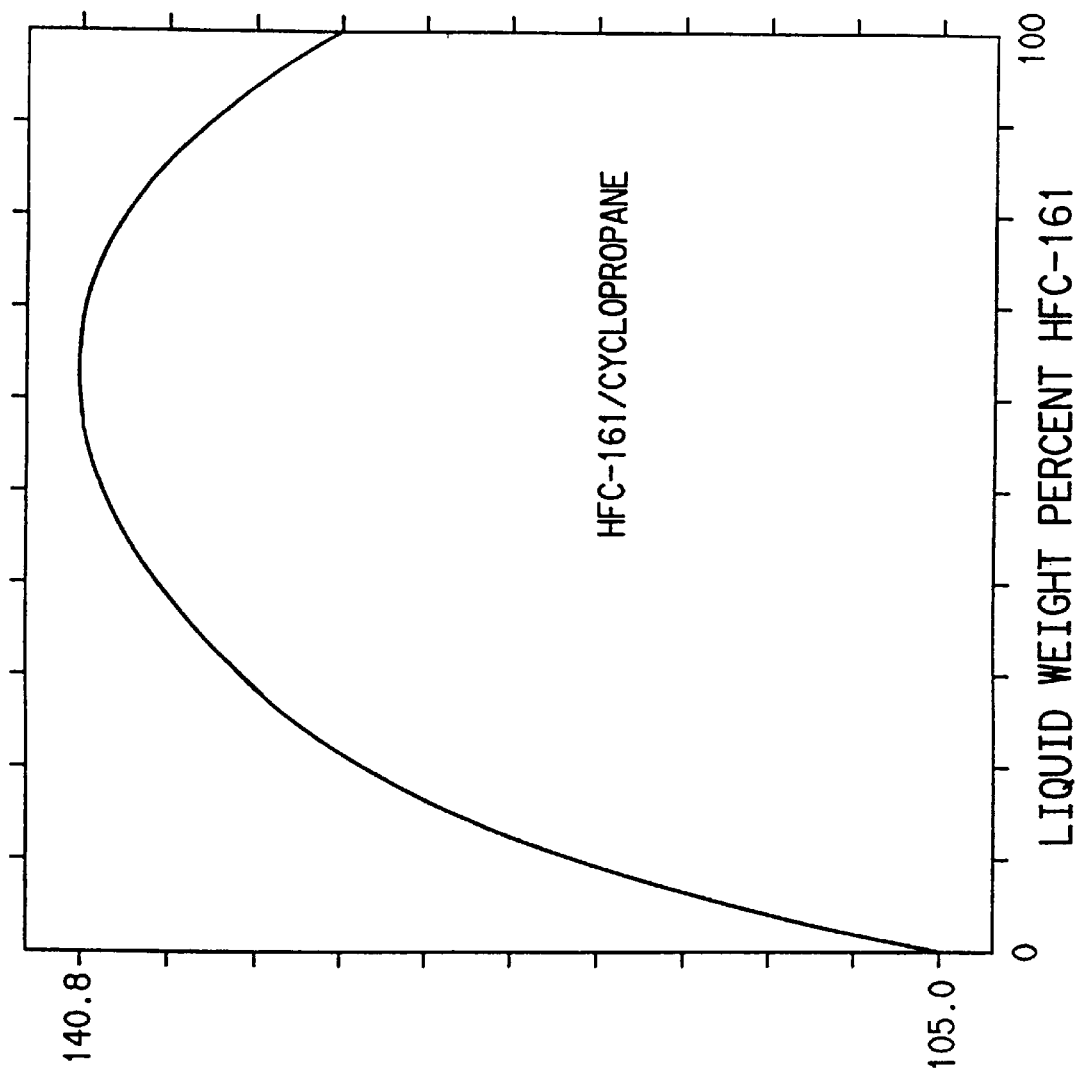
FIG. 15 is a graph of the vapor pressure of liquid mixtures of HFC-161 and cyclopropane at 25° C.
Figure 16:
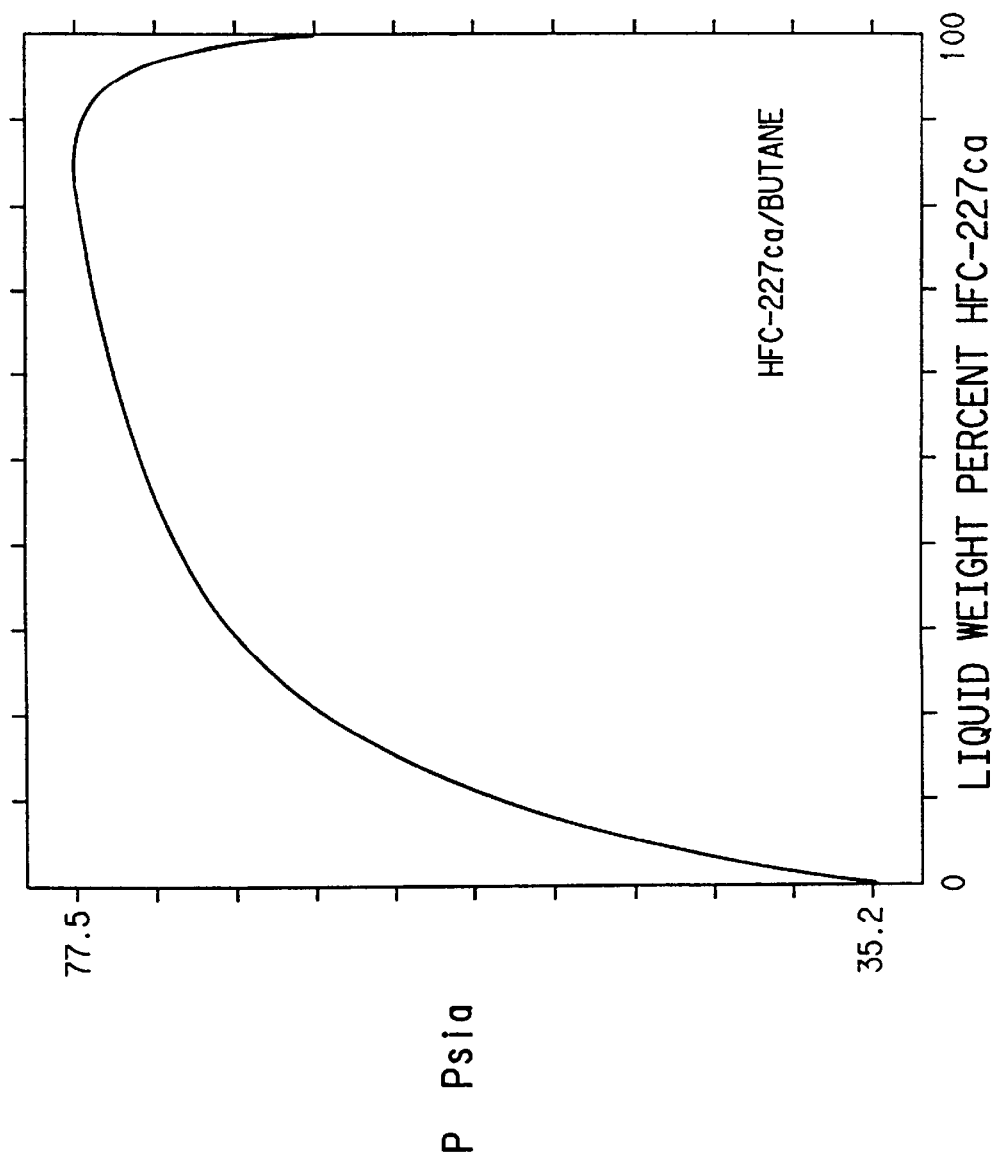
FIG. 16 is a graph of the vapor pressure of liquid mixtures of HFC-227ca and butane at 25° C.
Figure 17:
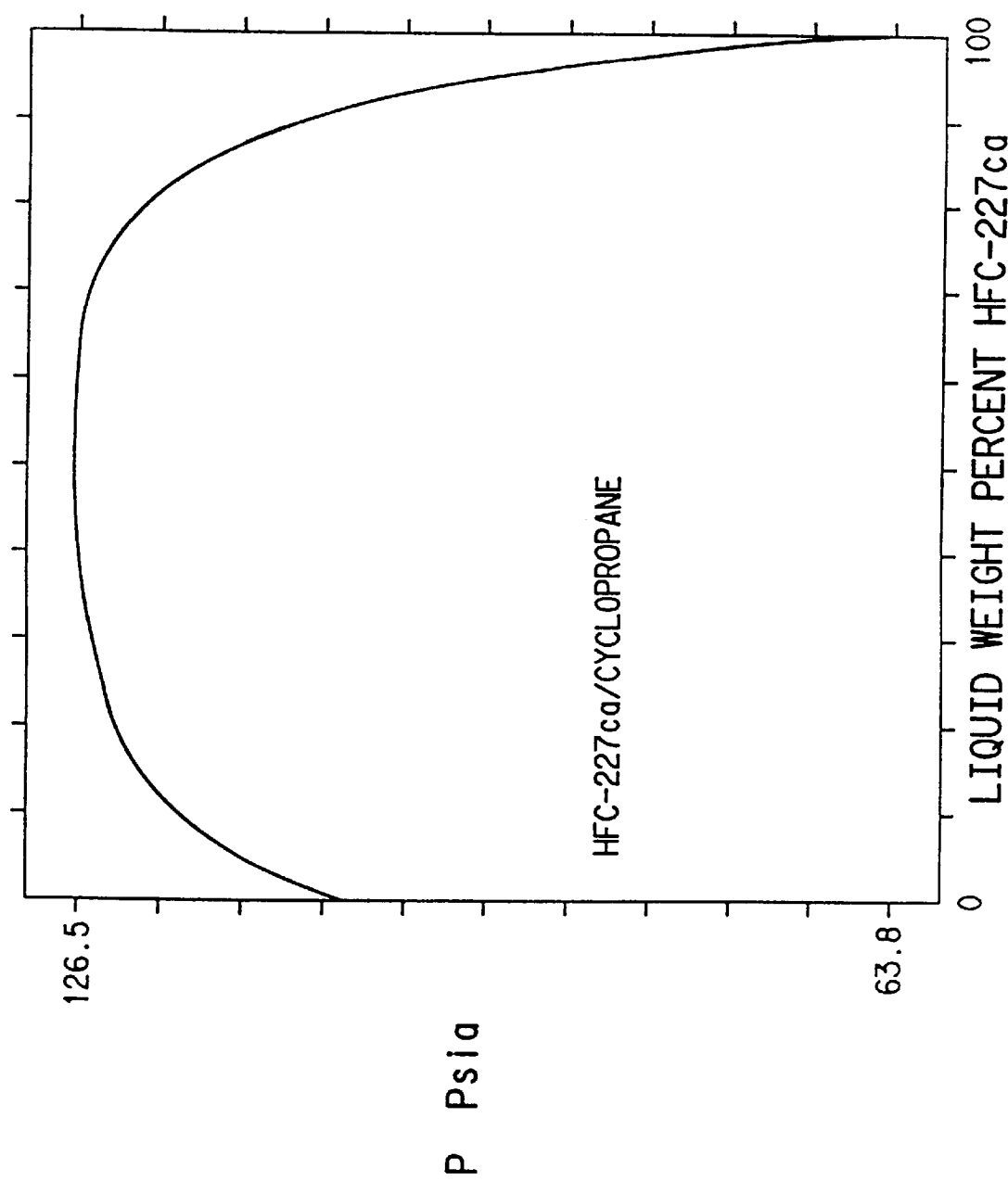
FIG. 17 is a graph of the vapor pressure of liquid mixtures of HFC-227ca and cyclopropane at 25° C.
Figure 18:
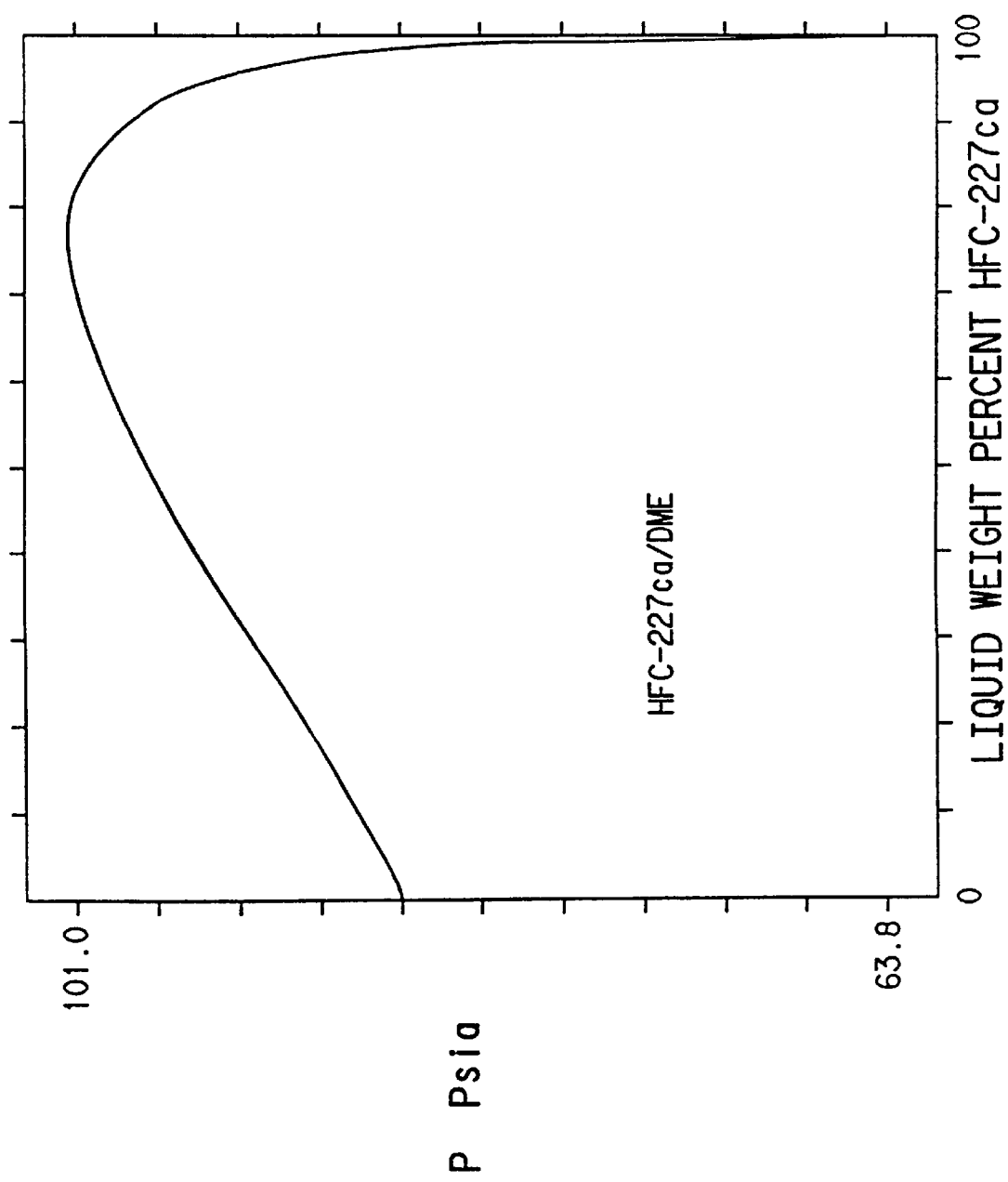
FIG. 18 is a graph of the vapor pressure of liquid mixtures of HFC-227ca and DME at 25° C.
Figure 19:
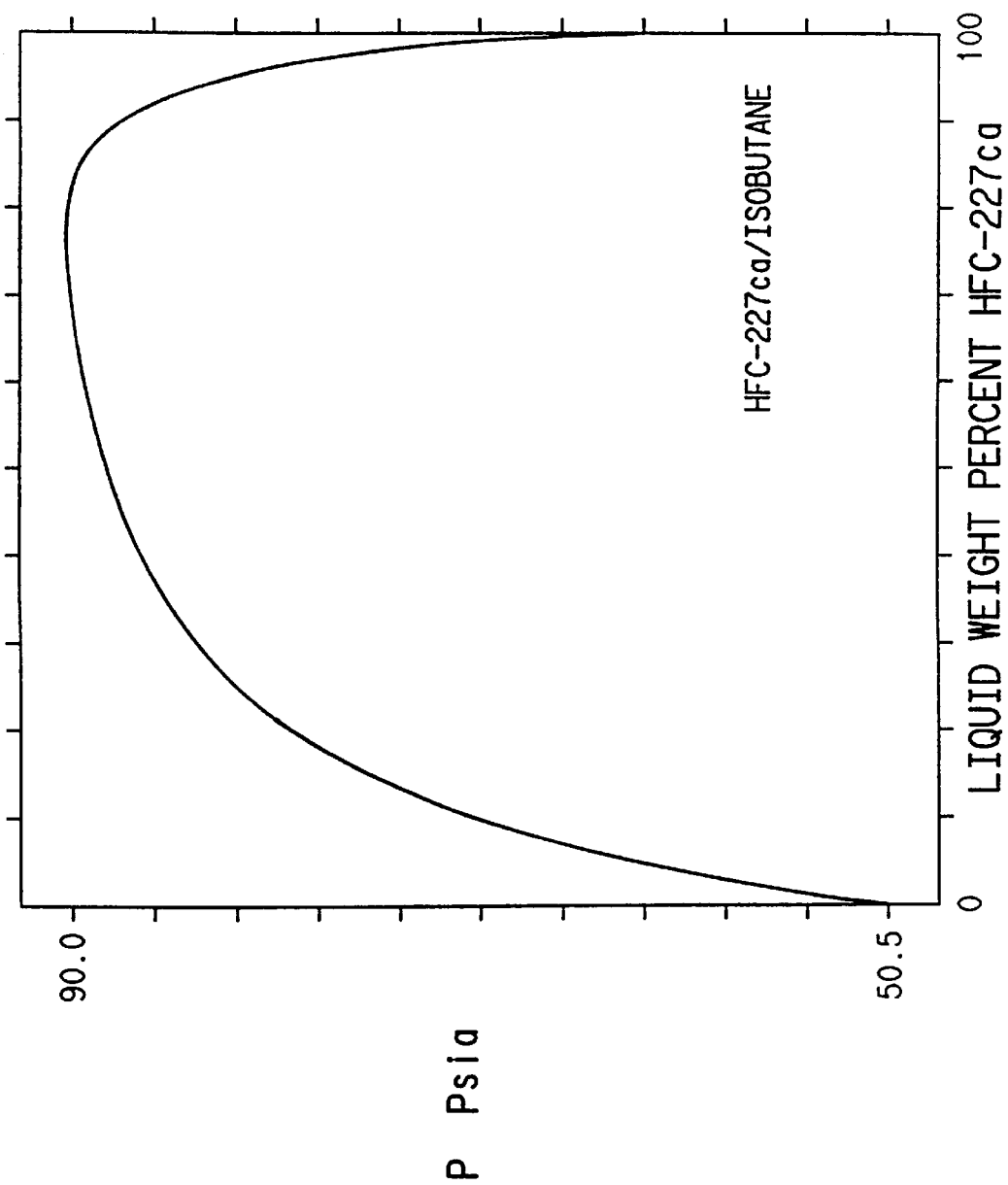
FIG. 19 is a graph of the vapor pressure of liquid mixtures of HFC-227ca and isobutane at 25° C.
Figure 20:
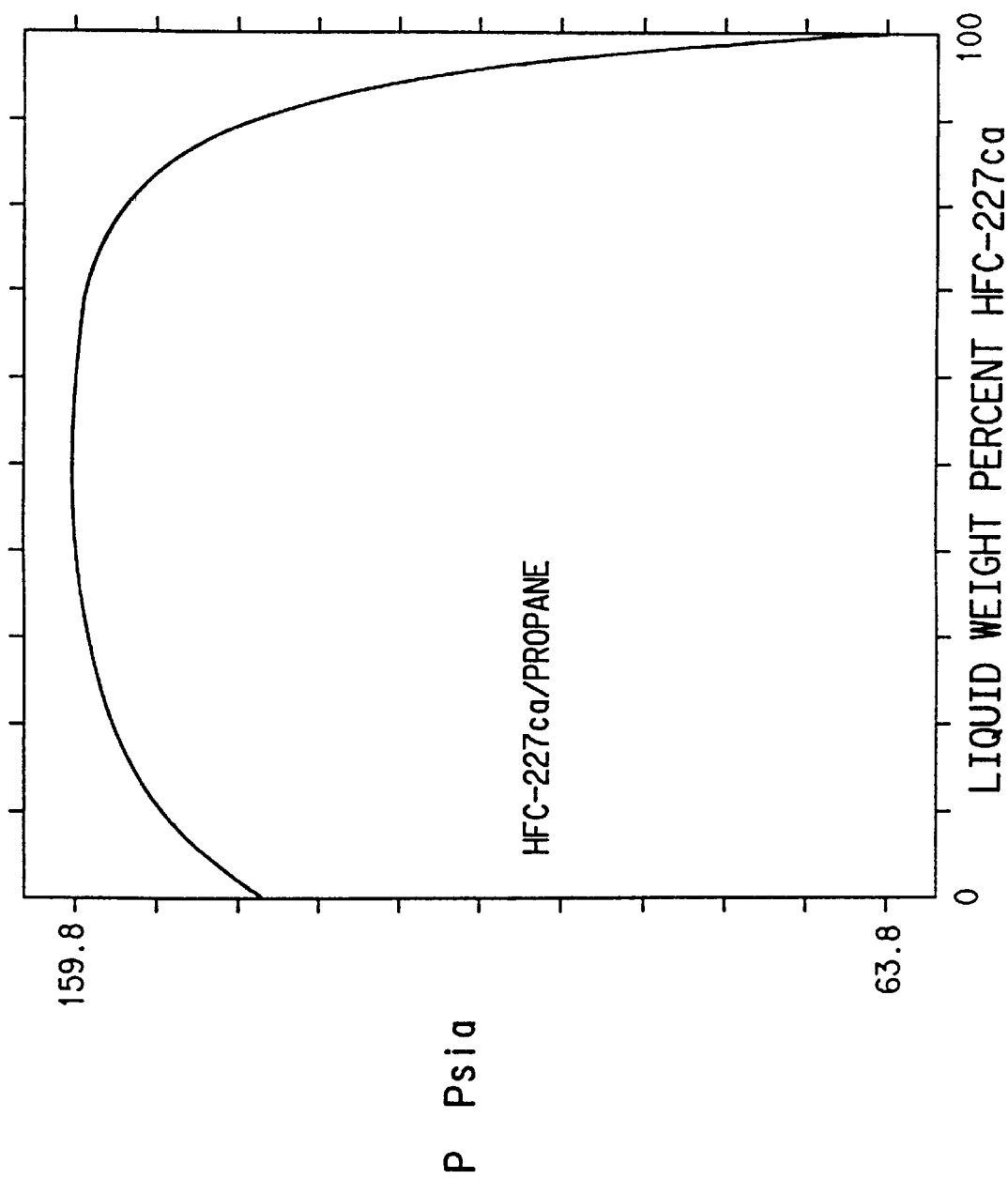
FIG. 20 is a graph of the vapor pressure of liquid mixtures of HFC-227ca and propane at 25° C.
Figure 21:
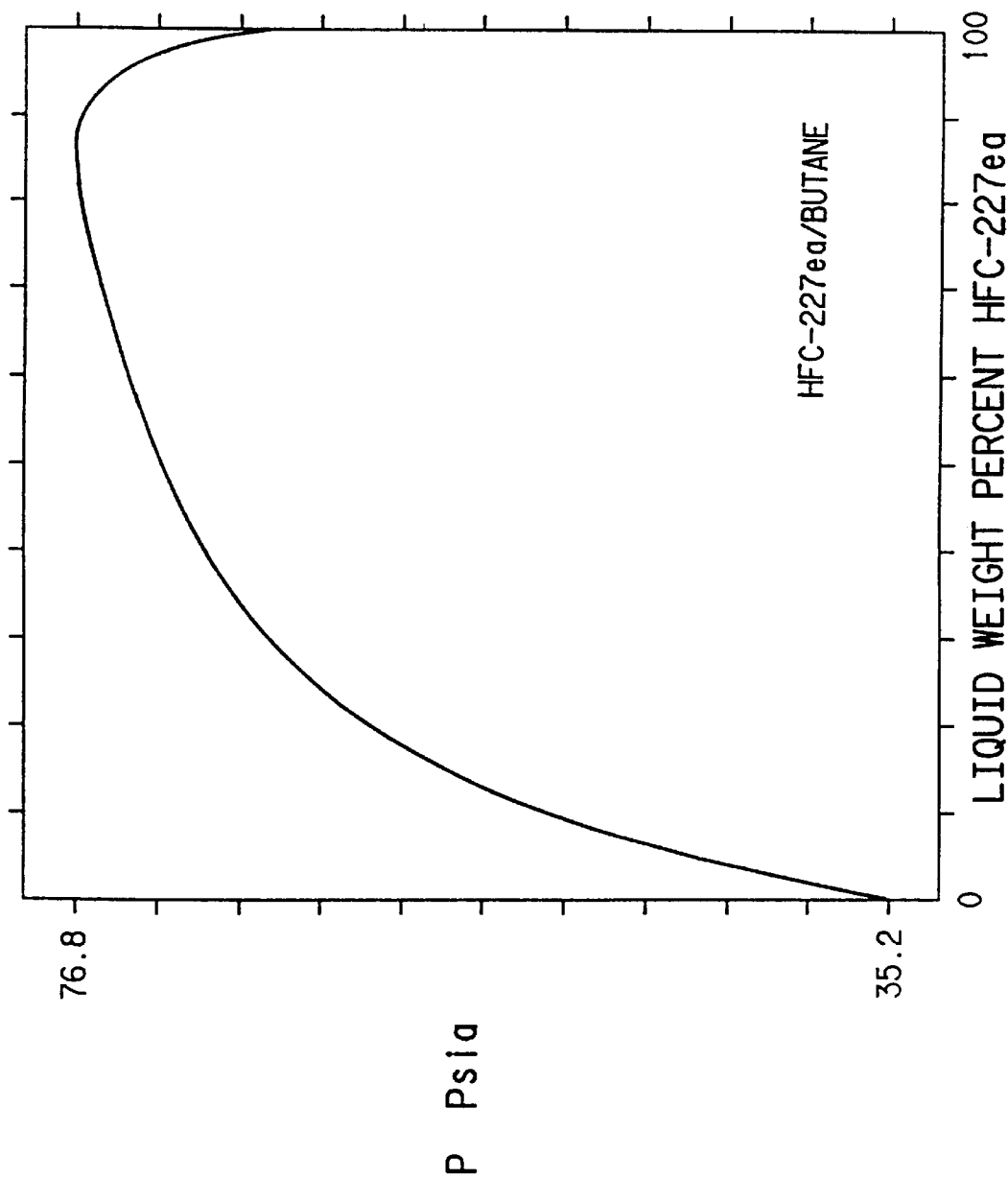
FIG. 21 is a graph of the vapor pressure of liquid mixtures of HFC-227ea and butane at 25° C.
Figure 22:
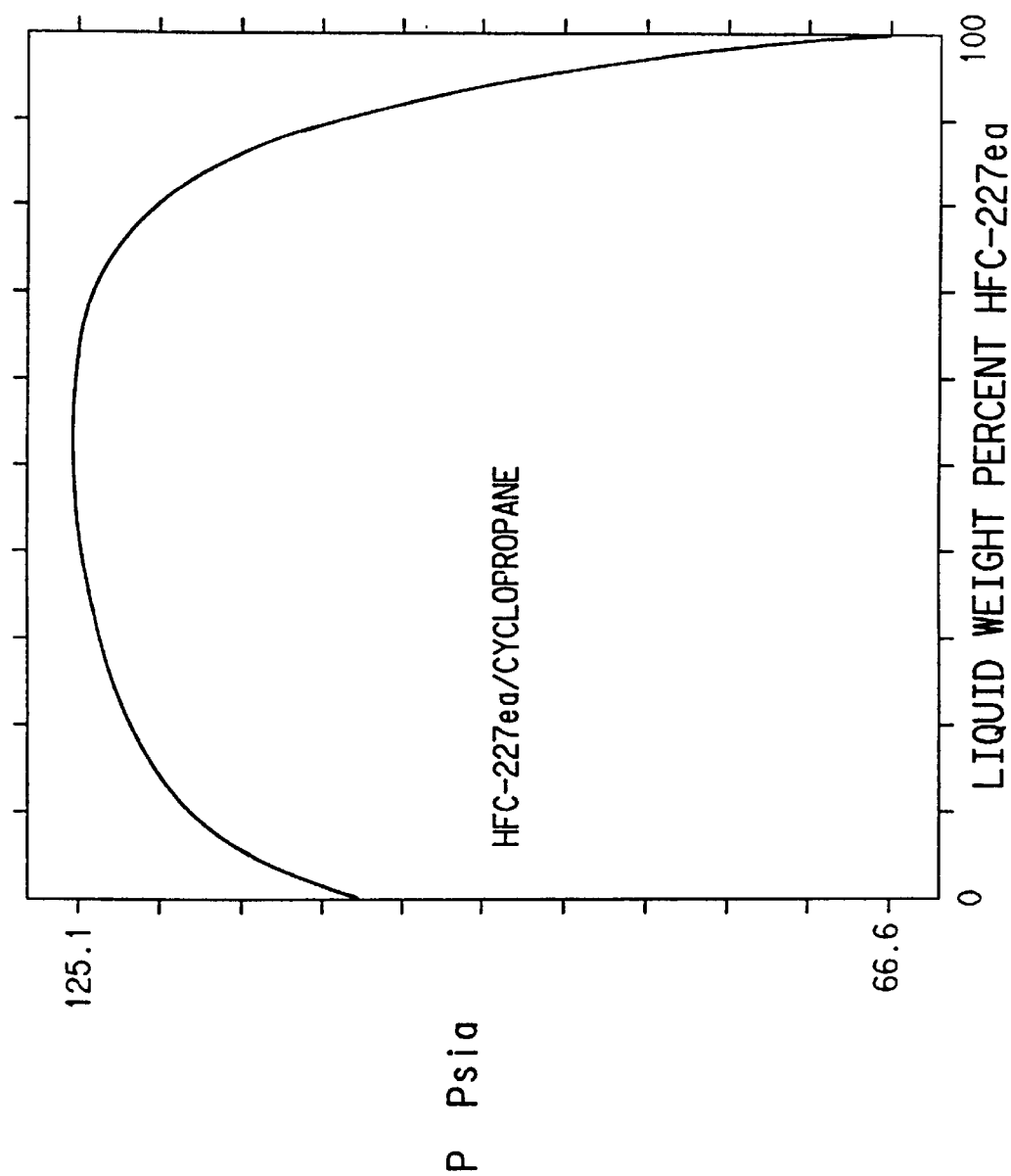
FIG. 22 is a graph of the vapor pressure of liquid mixtures of HFC-227ea and cyclopropane at 25° C.
Figure 23:
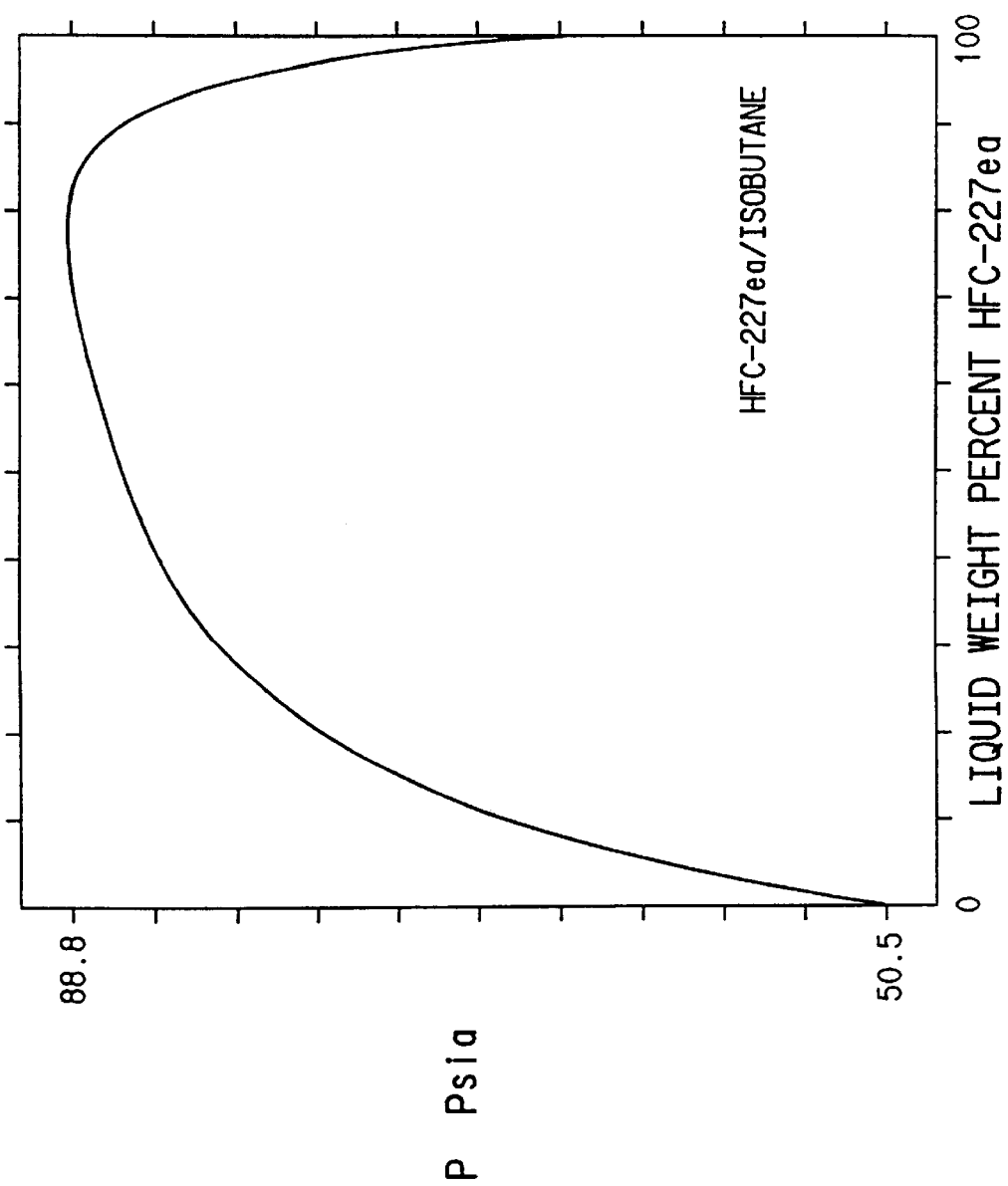
FIG. 23 is a graph of the vapor pressure of liquid mixtures of HFC-227ea and isobutane at 25° C.
Figure 24:
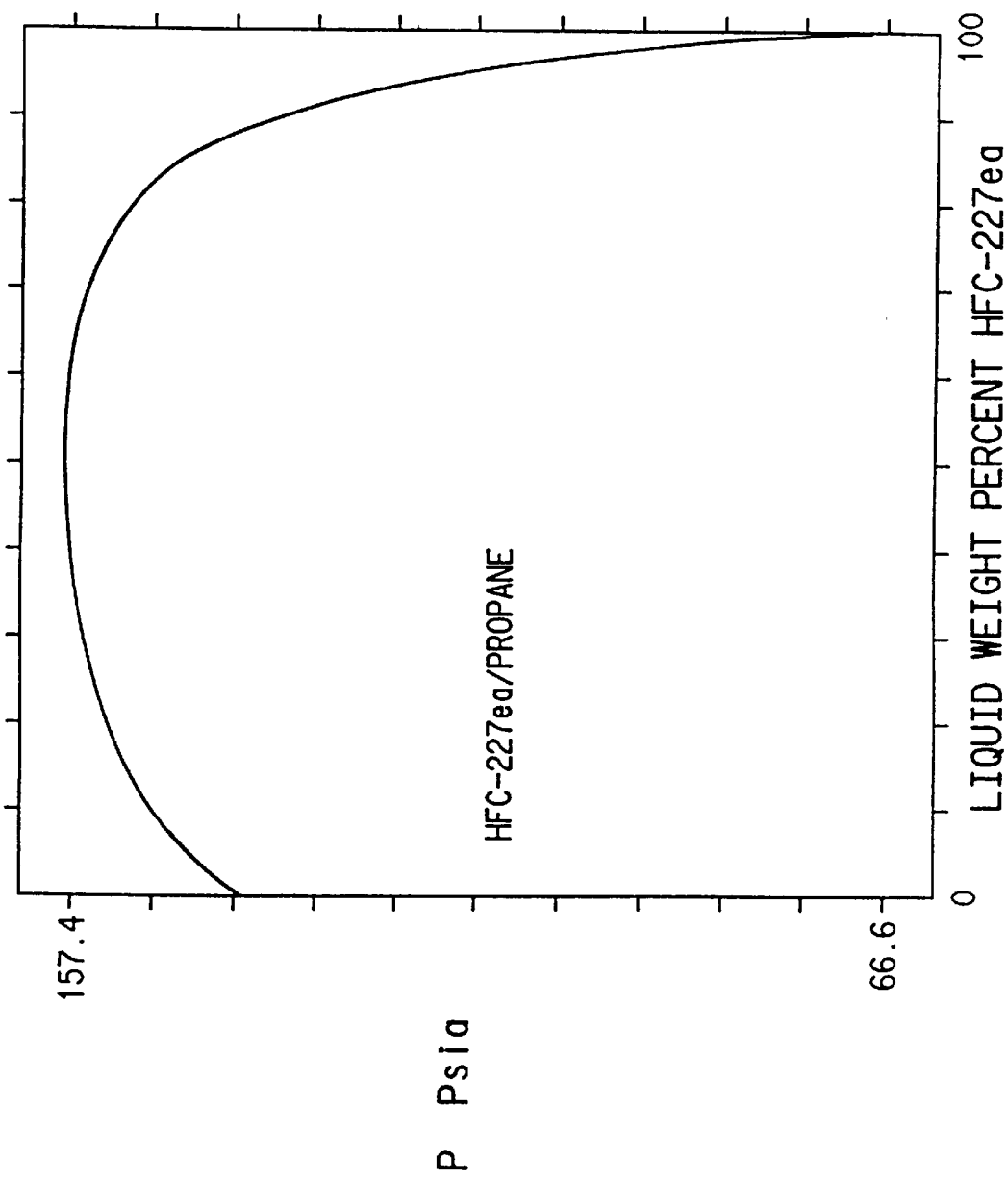
FIG. 24 is a graph of the vapor pressure of liquid mixtures of HFC-227ea and propane at 25° C.

The data in FIG. 4 show that at 0° C., there are ranges of compositions that have vapor pressures higher than the vapor pressures of the pure components of the composition at that same temperature.

The procedure for measuring the vapor pressure of mixtures of HFC-32/cyclopropane was carried out in the same way for mixtures of HFC-125/cyclopropane, HFC-1 34/propane and HFC-1 34a/cyclopropane, except that the measurements of the vapor pressure of mixtures of HFC-134/propane were taken at 15° C. and the measurements of the vapor pressure of mixtures of HFC-134a/cyclopropane were taken at 0.01° C.

ADDITIONAL COMPOUNDS

Other components, such as aliphatic hydrocarbons having a boiling point of –60 to +60° C., hydrofluorocarbonalkanes having a boiling point of –60 to +60° C., hydrofluoropropanes having a boiling point of between –60 to +60° C., hydrocarbon ethers having a boiling point between –60 to +60° C., hydrochlorofluorocarbons having a boiling point between –60 to +60° C., hydrofluorocarbons having a boiling point of –60 to +60° C., hydrochlorocarbons having a boiling point between –60 to +60° C., chlorocarbons and perfluorinated compounds, can be added to the azeotropic or azeotrope-like compositions described above.

Additives such as lubricants, surfactants, corrosion inhibitors, stabilizers, dyes and other appropriate materials may be added to the novel compositions of the invention for a variety of purposes provides they do not have an adverse influence on the composition for its intended application. Preferred lubricants include esters having a molecular weight greater than 250.

It is claimed that:

1. An azeotropic or azeotrope-like composition consisting essentially of: 93.8–99 weight percent difluoromethane and 1–6.2 weight percent isobutane; 50–99 weight percent difluoromethane and 1–50 weight percent propylene; or 60–99 weight percent difluoromethane and 1–40 weight percent cyclopropane; wherein the vapor pressure of the composition is higher than the vapor pressure of the individual components at about 25° C., when the temperature has been adjusted to about 25° C.

2. The azeotropic or azeotrope-like composition of claim 1, said composition consisting essentially of 70–99 weight percent difluoromethane and 1–30 weight percent propylene; or 60–99 weight percent difluoromethane and 1–40 weight percent cyclopropane.

3. A process for producing refrigeration, comprising condensing a composition of claims 1 or 2 and thereafter evaporating said composition in the vicinity of the body to be cooled.

4. A process for producing heat comprising condensing a composition of any of claims 1 or 2 in the vicinity of a body to be heated, and thereafter evaporating said composition.

5. An azeotropic composition consisting essentially of about 93.8 weight percent of difluoromethane and about 6.2 weight percent of isobutane, wherein when the temperature has been adjusted to about 25° C., said composition has a vapor pressure of about 249.6 psia (1721 kPa).

6. An azeotropic composition consisting essentially of about 81.0 weight percent of difluoromethane and about 19.0 weight percent of propylene, wherein when the temperature has been adjusted to about 25° C., said composition has a vapor pressure of about 261.5 psia (1803 kPa).

7. An azeotropic composition consisting essentially of about 85.2 weight percent of difluoromethane and about 14.8 weight percent of cyclopropane, wherein when the temperature has been adjusted to about 25° C., said composition has a vapor pressure of about 260.6 psia (1797 kPa).

* * * * *